(12) United States Patent
Zamiska et al.

(10) Patent No.: US 11,520,332 B1
(45) Date of Patent: Dec. 6, 2022

(54) SYSTEM FOR AUTOMATED EXPLORATION BY AN AUTONOMOUS MOBILE DEVICE USING MARKERS BASED ON IMAGE FEATURES

(71) Applicant: AMAZON TECHNOLOGIES, INC., Seattle, WA (US)

(72) Inventors: James Charles Zamiska, Palo Alto, CA (US); David Allen Fotland, San Jose, CA (US); Roger Robert Webster, Los Altos, CA (US); Mohit Deshpande, San Jose, CA (US); Robert Franklin Ebert, Los Altos Hills, CA (US); Nikhil Sharma, Fremont, CA (US); Rachel Liao, Santa Clara, CA (US); Chang Young Kim, Newark, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 386 days.

(21) Appl. No.: 16/702,008

(22) Filed: Dec. 3, 2019

(51) Int. Cl.
  *G05D 1/00* (2006.01)
  *G01S 17/931* (2020.01)
  *G05D 1/02* (2020.01)

(52) U.S. Cl.
  CPC .......... *G05D 1/0088* (2013.01); *G01S 17/931* (2020.01); *G05D 1/0251* (2013.01)

(58) Field of Classification Search
  CPC ... G05D 1/0088; G05D 1/0251; G01S 17/931
  See application file for complete search history.

(56) References Cited

U.S. PATENT DOCUMENTS

| 2015/0304634 | A1* | 10/2015 | Karvounis | G06V 10/25 348/46 |
| 2018/0306587 | A1* | 10/2018 | Holz | G05D 1/0274 |
| 2020/0167953 | A1* | 5/2020 | Liu | G05D 1/0094 |

\* cited by examiner

*Primary Examiner* — Truc M Do
(74) *Attorney, Agent, or Firm* — Lindauer Law, PLLC

(57) ABSTRACT

An autonomous mobile device (AMD) uses sensors to explore a physical space and determine the locations of obstacles. Simultaneous localization and mapping (SLAM) techniques are used by the AMD to designate as keyframes some images and their associated descriptors of features in the space. Each keyframe indicates a location and orientation of the AMD relative to those features. Anchors are specified relative to keyframes. A marker is specified relative to one or more anchors. Because markers are associated with features in the physical space, they maintain their association with the physical space through various processes such as SLAM loop closures. Markers may specify locations in the physical space, such as navigation waypoints, navigation destinations such as a goal pose for exploring an unexplored area, as an observation target to facilitate exploration, and so forth. Markers may also be used to specify block listed locations to be avoided during exploration.

20 Claims, 11 Drawing Sheets

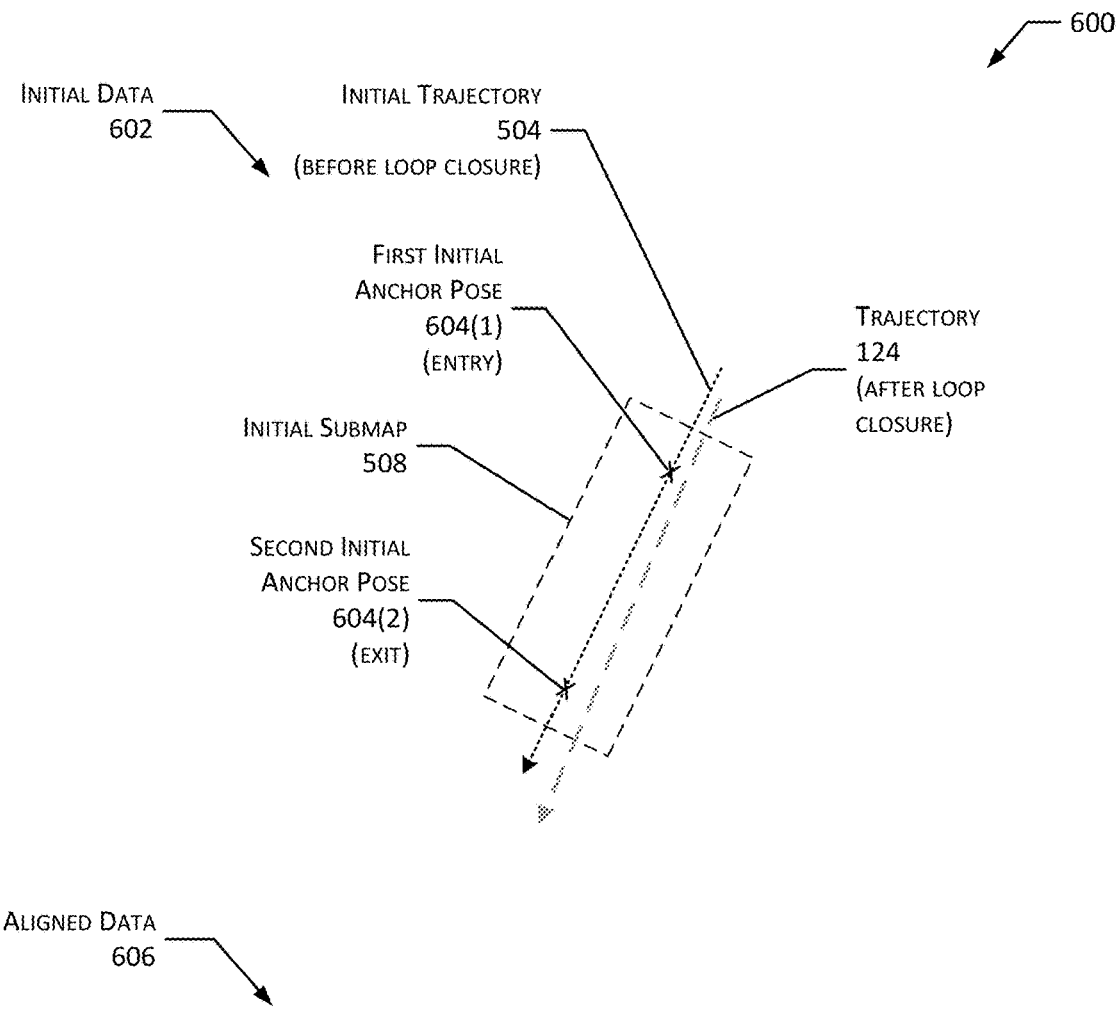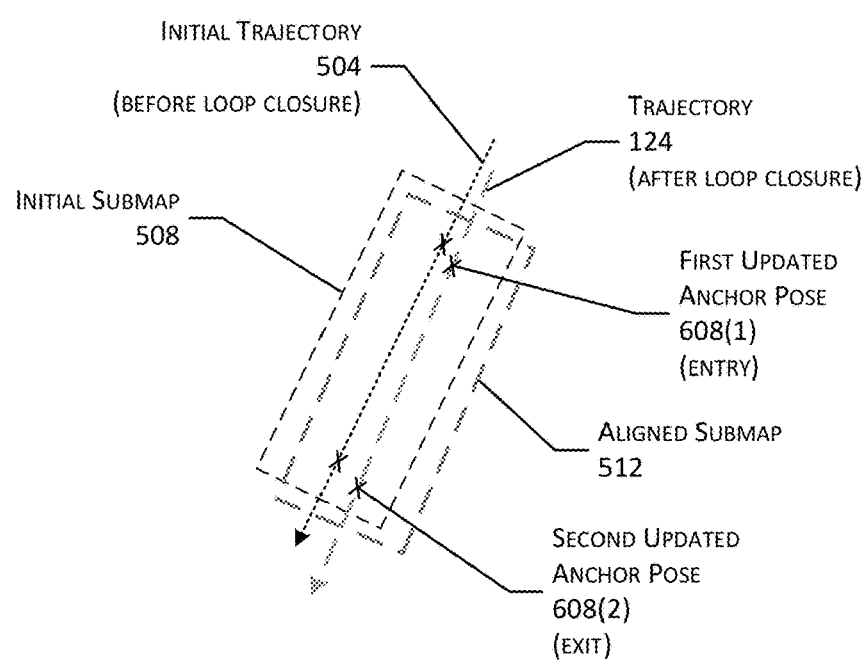
FIG. 6

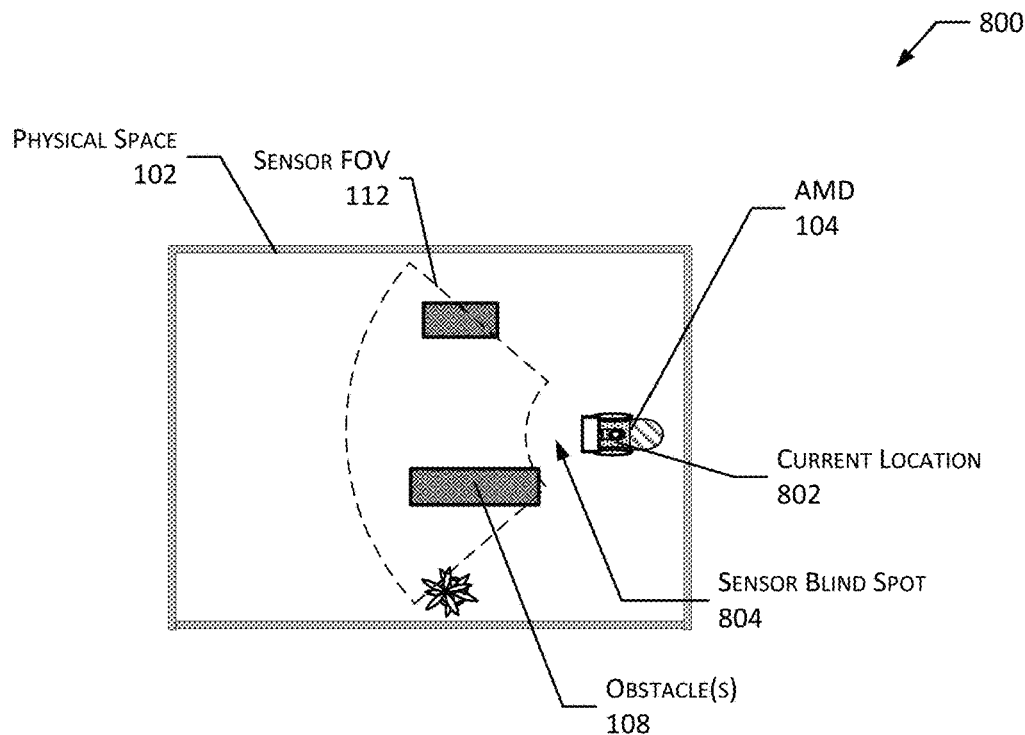
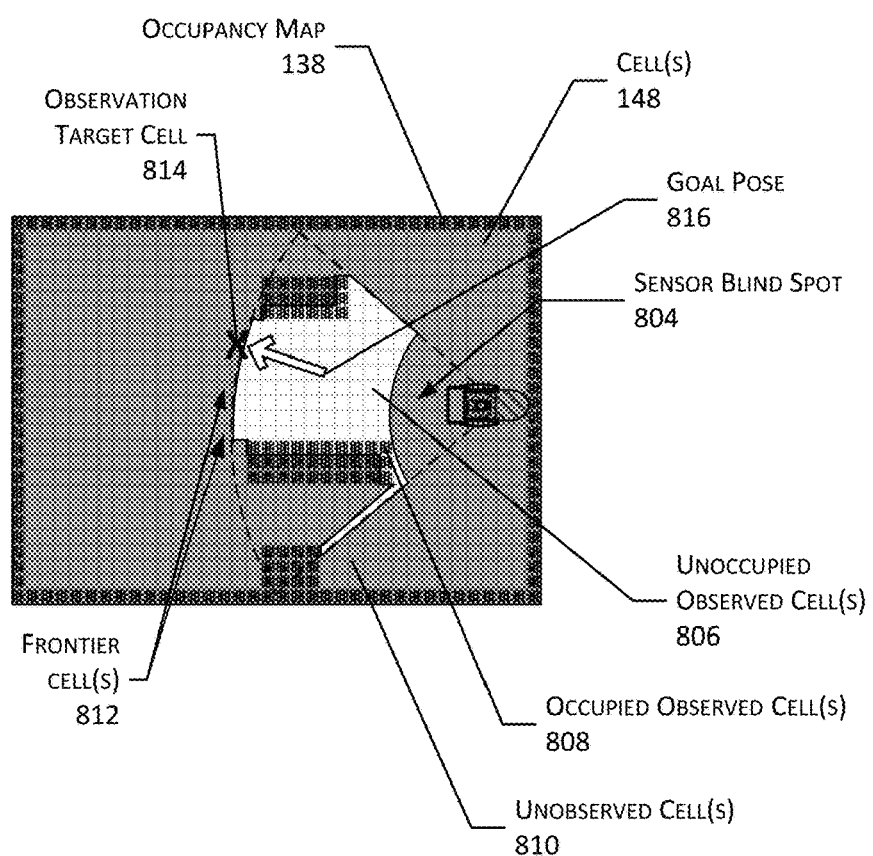
FIG. 8

OCCUPANCY MAP 138 OR NAVIGATION MAP 348

| CELL IDENTIFIER 902 | LOCATION OF AREA (CELL COORDINATES RELATIVE TO ORIGIN) 904 | OBSERVATION STATUS 906 | OCCUPANCY VALUE 908 |
|---|---|---|---|
| 1 | 397, 713 | UNOBSERVED | - |
| 2 | 399, 713 | UNOBSERVED | - |
| 3 | 401, 713 | UNOBSERVED | - |
| 4 | 403, 713 | OBSERVED | OCCUPIED |
| 5 | 405, 713 | OBSERVED | OCCUPIED |
| 6 | 407, 713 | OBSERVED | UNOCCUPIED |
| 7 | 409, 713 | OBSERVED | UNOCCUPIED |
| 8 | 411, 713 | OBSERVED | OCCUPIED |

...

BLOCK LIST DATA 142

OBSERVATION TARGET BLOCK LIST DATA 910

| BLOCK LIST IDENTIFIER 912 | CELL IDENTIFIER 902 | MARKER IDENTIFIER 236 | COUNT OF OCCURRENCES 914 |
|---|---|---|---|
| 1 | 19 | 39481 | 1 |
| 2 | 37 | 55135 | 5 |

...

GOAL BLOCK LIST DATA 916

| BLOCK LIST IDENTIFIER 912 | CELL IDENTIFIER 902 | MARKER IDENTIFIER 236 | PAIRED WITH? 918 | COUNT OF OCCURRENCES 914 |
|---|---|---|---|---|
| 3 | 47 | 33591 | - | 3 |
| 4 | 198 | 55841 | 2 | 2 |
|   |   |   |   |   |

SYSTEM FOR AUTOMATED EXPLORATION BY AN AUTONOMOUS MOBILE DEVICE USING MARKERS BASED ON IMAGE FEATURES

BACKGROUND

An autonomous mobile device (AMD) moves throughout a physical space. To facilitate this movement, the AMD gathers information about the physical space to determine where obstacles are located and builds a map with this information.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates an enlarged view of a submap and the transform that provides an aligned submap after trajectory adjustment, according to some implementations.

FIG. 8 illustrates the AMD during an exploration to build the occupancy map, according to some implementations.

FIG. 9 illustrates data associated with the occupancy map or navigation map and block list data of markers associated with locations to be avoided during exploration, according to some implementations.

Figure 1:
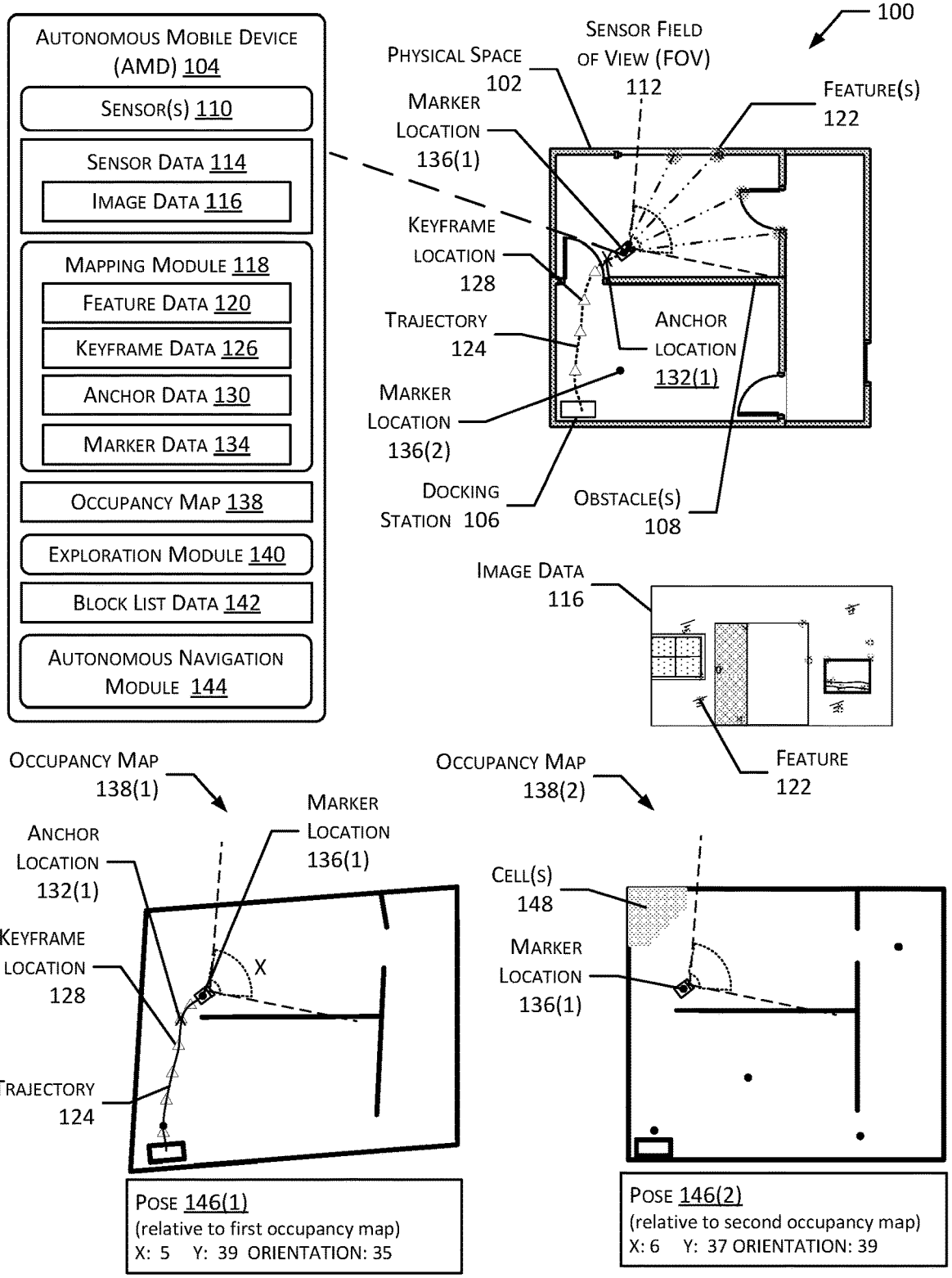
FIG. 1 illustrates a system for automated exploration and navigation of a physical space with an autonomous mobile device (AMD) using markers based on image features, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD needs to have information about where obstacles are in the physical space. This information is used to plan a path for the AMD to traverse, to avoid collisions with obstacles, and so forth. For example, the AMD should be able to move from a first location to a second location while avoiding collisions with furnishings, walls, people, falling down stairs, and so forth.

An occupancy map is determined using sensor data from one or more sensors and provides information about where obstacles are in the physical space. The occupancy map comprises cells in a specified arrangement, a grid of cells. Each cell may be represented by an index value indicative of that cell within the grid. Each cell is associated with a particular location in the physical space. For example, each cell may represent an area in the physical space that is 5 centimeters (cm) by 5 cm. Each cell may also be associated with an occupancy value that indicates whether the particular area in the physical space associated with that cell is occupied by an obstacle, unoccupied, or whether there is no data that is associated with that cell being unobserved. For example, an occupancy value of −1 may indicate an unoccupied cell with no obstacle, an occupancy value of 0 indicates the cell has been unobserved, while +1 indicates the cell is occupied by an obstacle. For ease of discussion, and not necessarily as a limitation, description with regard to cells may refer to the data associated with the cells or, as appropriate, the physical space associated with the cell. For example, an action such as moving to a cell may comprise moving the AMD to the physical space associated with the cell.

The sensors on the AMD or in the physical space acquire the sensor data. The sensor data is processed to determine information such as a current location of the AMD in the physical space and to provide the information that is used to determine the occupancy map. The sensors exhibit various limitations, including a particular field of view (FOV), working range, may require line of sight to operate, exhibit blind spots, and so forth. Except for very unusual circumstances such as very simple physical spaces, the sensors are not able to simultaneously see all of the areas in the physical space. As a result, the AMD gathers information about the physical space by moving and directing the FOV of the sensors in different directions.

As the AMD moves through the environment, it uses techniques known as simultaneous localization and mapping (SLAM) to determine where it is and how far it has moved. Localization is determining where the AMD is in the physical space. For example, cameras may acquire images. These images are processed to determine the presence of features in the images, such as edges of doors, shadows on the wall, and so forth. A descriptor is information that describes a particular feature. Various techniques such a scale-invariant feature transform (SIFT) may be used to characterize the features and generate the descriptors. The SLAM may use data from other sensors such as motor encoders, inertial measurement units (IMU) with one or more accelerometers and gyroscopes, and so forth.

While the AMD is moving and SLAM is operating, SLAM provides as output a series of poses, each pose describing a location and rotations in space that are based at least in part on the apparent motion of observed features in the images. For example, a pose may comprise information about six dimensions (6D), that of three orthogonal axes and corresponding rotations about those axes. These poses may be combined to provide a trajectory of the AMD.

While the AMD is moving, other sensors are acquiring information about the physical space. One or more depth sensors may acquire depth data about the presence or absence of obstacles in the physical space. For example, the depth sensors may comprise a time-of-flight (TOF) depth camera, ultrasound, radar, and so forth. The depth data provided by a depth sensor is indicative of whether an obstacle is detected or not, and also includes information about the distance between the sensor and the obstacle and the relative direction with respect to the sensor of an obstacle, if detected.

During operation of the AMD, various factors introduce uncertainty into the resulting poses. These factors may include sensor noise, changing lighting conditions that change the appearance of features in images, dynamic obstacles such as people moving through the physical space, and so forth. This uncertainty may manifest as apparent drift of the poses with respect to the physical space. As the AMD moves through the physical space, the uncertainty accumulates. For example, if the AMD starts at a docking station, moves around a home, and returns to that docking station, due to drift the AMD would determine that the location of the docking station has changed even though the docking station has remained stationary. This uncertainty may also manifest as apparent changes or differences in where an obstacle appears to be from one observation to another.

To address this issue, SLAM of the AMD may utilize a technique known as loop closure. With loop closure, the AMD recognizes it has returned to a previously visited area, thus "closing a loop" that returns the AMD to about the same place in the physical space. An assumption can be made that fixed objects have not been moved since the last visit. The loop closure process provides an updated trajectory which attempts to correct for drift. These loop closure operations result in changes or shifts to the occupancy map that has been developed so far. For example, while the actual obstacles in the physical space may have remained stationary, a wall may shift from one set of coordinates to another between successive versions of an occupancy map.

Traditional systems describe the location of obstacles, landmarks, or points of interest with regard to the occupancy map. For example, an obstacle may be associated with a cell in a first version of the occupancy map at coordinates X=17, Y=39. As described above, loop closure or other processes may result in the position of that cell with respect to the physical space changing. Continuing the example, the same obstacle in a second version of the occupancy map may now be at coordinates X=23, Y=35. As a result, the location of an obstacle appears to have changed, at least relative to the occupancy map, while the obstacle itself has not moved in the physical space. To maintain persistence across changes to the occupancy map, these changes must be accounted for, increasing system complexity.

Attempting to maintain the persistence across changing occupancy maps introduces additional variability, which may make it difficult or impossible for the AMD to return to the same position in the physical space. For example, it may be desirable for the AMD to return to a particular landmark to within a margin of error of 5 cm. Using traditional techniques with coordinates associated with the occupancy map, after numerous loop closures, the AMD may only be able to return to within 20 cm of the landmark. In another example, if the AMD is trying to avoid a particular location in the physical space that contains a hazard or is unusable for an operation such as exploration, the reduced accuracy may result in undesired operation. Continuing this example, the AMD could move into an unwanted area or may try to explore an area that has been block listed as being unsuitable for exploration.

Described in this disclosure are techniques for determining and using markers that are based on features. A marker comprises data that represents a location in the physical space with respect to a set of one or more features in an image. Because the marker specifies a location with respect to those features as presented and observed in the physical space, the marker refers to the same location in the physical space across time. A marker may be used to specify a location of an obstacle, landmark, or point of interest. For example, a marker may be used to specify an obstacle such as a corner of a wall, a landmark such as "front door", or a point of interest specified by a user, such as "wait for me here".

During operation of the AMD, the SLAM system may designate descriptors of features that are associated with images as "keyframes", and each keyframe has an associated keyframe pose that indicates the location and orientation of the AMD that corresponds to the keyframe. The keyframe may comprise the image itself or a data structure comprising the keyframes may be designated based on distance, time, changing features in the image data, and so forth. For example, a keyframe may be designated every 3 seconds. Information about the keyframe such as keyframe pose and the descriptors of features found in associated image data may be stored for later reference. Later, the SLAM system may compare current information such as pose and descriptors with keyframe data to determine if the AMD has previously visited that place in the physical space.

The AMD, or another computing device, may generate submaps of depth data that are tied to trajectory data provided by a SLAM system and subsequently aligned. For example, the depth data may comprise occupancy probability values that are indicative of whether a particular portion of a submap contains an obstacle. These aligned submaps may then be combined to determine an occupancy map of the physical space. As the AMD moves around the physical space, an initial trajectory is determined. For example, the initial trajectory may comprise the keyframe poses generated by the SLAM system during movement. Meanwhile, depth data is being obtained about the physical space as the AMD moves.

A submap may be determined based on occurrence of a trigger. For example, a new submap may be generated when the AMD has travelled 3 meters. Each submap is associated with at least two initial poses. For example, when a first submap is generated, an initial keyframe pose associated with that point in time or location may be used to create or designate an initial entry anchor pose. When the trigger determines a second submap is generated, a keyframe pose associated with that point in time or location is used to create or designate an initial exit anchor pose for the first submap. That initial exit anchor pose may be duplicated or otherwise used as the initial entry anchor pose for the second submap. In this fashion, the submaps may be "daisy chained" together, each pair of submaps sharing a common anchor pose.

As mentioned above, drift accumulates, resulting in some uncertainty as to where the poses produced by SLAM are with respect to the physical space and one another. Once a loop closure event takes place, the updated trajectory comprises updated poses. For example, compared to an initial pose, an updated pose may have one or more of location or orientation changed by translation or rotation to a different set of coordinates. The pose still represents the same place in the physical space, but the updated pose may differ from the initial pose with respect to at least one degree of freedom.

Each submap has at least two initial anchor poses that are based on initial keyframe poses. The updated keyframe poses that are associated with the initial keyframe poses are used to determine updated anchor poses. With this information, it is known where the initial submap was with respect to the initial trajectory, and the corresponding anchor poses as updated on the updated trajectory have been identified. Using this information, transform data is determined that associates the initial anchor poses with their respective updated anchor poses. For example, a least squares transform may be used to associate the initial entry anchor pose with the updated entry anchor pose and the initial exit anchor pose with the updated exit anchor pose. The transform data, such as a transform matrix, may then be applied to the initial submap to produce an aligned submap. For example, this may be envisioned as rotating and translating, as needed, the initial submap so the initial anchor poses align with the updated anchor poses. In some implementations, for this transform the submap may be considered to be rigid.

The aligned submap is now aligned to the updated trajectory. When combined with the other aligned submaps, occupancy data may be determined and used to generate an occupancy map. The process of determining and aligning the submaps results in an occupancy map that is highly accurate in representing the physical space. As a result, subsequent navigation of the AMD that is based on the occupancy map is more efficient and effective. For example, by having a properly aligned and accurate occupancy map, the AMD is able to minimize improper routing and avoid having to re-route, such as when encountering a wall along the path where a door is expected.

As described, the AMD generates the occupancy map while moving through the physical space. However, in most instances the AMD has no knowledge of the physical space before operation, or that knowledge may be incomplete or outdated. To build this knowledge, and in particular to build the occupancy map, the AMD explores the environment. Markers may be used to provide highly efficient exploration that results in reduced time, compute resource usage, and power consumption during exploration.

As described above, the sensors on the AMD or in the physical space acquire the sensor data. The sensor data is processed to determine information such as a current location of the AMD in the physical space and to provide the information that is used to determine the occupancy map. The sensors exhibit various limitations, including a particular field of view (FOV), working range, may require line of sight to operate, exhibit blind spots, and so forth. Except for very unusual circumstances such as very simple physical spaces, the sensors are not able to simultaneously see all of the areas in the physical space. As a result, the AMD has to explore the physical space by moving and directing the FOV of the sensors so that sensor data about the physical space can be obtained.

Exploration may take place in different situations. For example, when the AMD is first introduced into the physical space, exploration is necessary to build the occupancy map for the first time. Likewise, things in the physical space may change over time, so the AMD may periodically explore at least part of the environment to update an existing occupancy map.

Traditional techniques for automated exploration of an environment by a robot involve several compromises and produce various behaviors that may be unsuitable for use. For example, a robot may use a serpentine search pattern to move through a room. In another example, a robot may move to a geometric center of a room and move the sensors so the FOV sweeps through a complete circle.

These traditional techniques can be very time and power intensive, leaving the robot unavailable for use for extended periods of time. These techniques may also be annoying to users. For example, a robot that moves in a serpentine pattern, stopping every meter to move the sensors so the FOV sweeps a complete circle could be annoying to a user in the room, especially in a residential or office environment where people may be present. Traditional techniques may also result in resource-consuming attempts to explore the same areas. For example, traditional techniques may repeatedly try to observe an area in the physical space that is associated with a cell that has been previously unobserved, repeating the same failed action over and over again.

Described in this disclosure are techniques and systems for the AMD to use markers to efficiently and quickly explore a physical space by reducing duplicative efforts and taking into consideration sensor limitations, such as FOV, working distance, sensor blind spots, and so forth. The AMD creates an initial occupancy map based on sensor data obtained from one or more sensors. Cells in the occupancy map are indicative of physical areas in the physical space that are either observed or unobserved. Markers are also designated, providing a location in the physical space with respect to features in the physical space that are depicted in images from the camera onboard the AMD. An observed cell may be indicative of a physical area in the physical space that is occupied or unoccupied. A marker may be associated with this observed cell.

A frontier is determined at the boundary between cells associated with occupancy values indicative of the corresponding physical areas having been observed as unoccupied and those cells with corresponding physical areas that are unobserved. A set of candidate frontier cells along the frontier that have occupancy values indicative of the physical area associated with those cells being unobserved are determined. For example, a candidate frontier cell is a cell that is associated with an area in the physical space that is unobserved, within a predetermined distance such as immediately adjacent to a border of an area in the physical space associated with a plurality of observed cells, and is not within a threshold distance of an area in the physical space associated with a cell indicated in block list data. The set of candidate frontier cells may be adjacent to one another.

An observation target (OT) cell is selected from the set of candidate frontier cells. For example, the OT cell may be picked that is closest to a current location of the AMD. In some implementations, an OT cell may be selected from each set of candidate frontier cells. For example, an OT cell may be selected for each frontier. A marker associated with the OT cell may be determined. For example, a first marker may be determined that is closest to the OT cell as indicated by a most recent version of the occupancy map. The first marker may be pre-existing or may be determined with respect to one or more anchor locations.

A goal pose is then determined based at least in part on the OT cell. The goal pose indicates a goal cell, that represents a location in the physical space, and an orientation for the AMD at that goal cell which directs the FOV of the sensors in the AMD towards the OT cell. For example, the goal pose is a location and direction from which the AMD would be expected to see the OT cell. A second marker corresponding to the goal cell may be determined. For example, the second marker may be determined that is closest to the goal cell as indicated by a most recent version of the occupancy map. The second marker may be indicative of the orientation.

Various parameters may be used to determine the goal cell. In one implementation the goal cell is a cell in the occupancy map that has an occupancy value indicative of being unoccupied, is not indicated in the block list data, is not an excluded cell (such as within an inflation distance of a cell that is occupied or unobserved), is between a minimum distance and a maximum distance of the OT cell, is closest to the OT cell, is in line of sight (LOS) of the OT cell, and is within at least a minimum distance threshold from the current location. The orientation is determined to orient a FOV of one or more sensors towards the OT cell.

If no goal pose is determined that satisfies the parameters, then the first marker associated with the OT cell may be added to the block list data. If a goal pose is determined, the AMD attempts to move to the second marker associated with that goal pose. If the AMD is unable to reach the second marker, then one or more of the second marker associated with the goal pose or the first marker associated with the OT cell may be added to the block list data. If the AMD is able to reach the second marker but the area in the physical space associated with the OT cell is unobserved, then one or more of the second marker associated with the goal pose or the first marker associated with the OT cell may be added to the block list data. While moving, the AMD may continue to gather sensor data.

If the second marker is reached and the physical space associated with the OT cell is observed, the FOV of the sensors looks past or beyond the frontier, gathering data about the physical space associated with the previously unobserved cells. Given the interaction of the OT cell determination and the goal pose determination, the AMD is able to quickly and accurately move within observed areas and the corresponding sensor FOV is so oriented to quickly expand the frontier.

The block list data specifies locations in the physical space as markers, which in subsequent iterations prevents the system from attempting to try and use the designated OT cell, goal pose, or combination thereof in subsequent iterations. By storing the block listed locations as markers, the problems associated with shifting locations due to intervening loop closures are avoided. As a result, even if the coordinates with respect to the occupancy map for a given OT cell or goal pose change, the underlying location in the physical space as specified by the features in the image remains the same. By so limiting the system, the exploration avoids attempts to re-explore using a cell associated with a marker that has been demonstrated as being unusable. As a result, exploration time is significantly reduced and the occupancy map is quickly filled in with observed cells.

In some implementations the block list data may not be deemed in effect until a threshold has been reached. For example, the markers associated with an OT cell and goal pose pair may not be considered and subsequently avoided until some number of attempts have been made to use that pair. In another example, a marker associated with an OT cell may not be considered and subsequently avoided until there have been some minimum number of goal poses involving that OT cell, in which those goal poses have been separated by some minimum distance and angle. Continuing this example, if the OT cell has been unobserved after trying to observe it from three separate goal poses, this OT cell may be deemed block listed and future attempts to explore would omit the marker associated with the OT cell.

The block list data may be persisted across exploration sessions. For example, a marker that is associated with a block listed OT cell in a first exploration may be maintained on the block list and considered as being block listed during a second exploration. In other implementations the block list data may be disregarded or removed over time. For example, entries in the block list data may expire after a threshold amount of time.

By using the techniques described in this disclosure, the AMD is able to quickly and efficiently explore a physical space. Duplicative efforts such as repetitive attempts to re-explore a portion of the physical space are significantly reduced or eliminated. Time spent, power consumption, and consumption of computational resources are all significantly reduced compared to traditional techniques. The techniques described herein also produce a more natural or organic movement through the physical space, which improves the user experience.

Navigation of the AMD is also improved as landmarks or points of interest may be specified as markers and persisted over time. For example, an arbitrary location in a room may be designated by a user and associated with a marker for subsequent use during navigation. The marker may be referred to for navigation purposes, even if the occupancy map has changed in the meantime. Continuing the example, the AMD may return to the arbitrary location even if the coordinates of that arbitrary location on a prior occupancy map differ from the coordinates on a current occupancy map.

Illustrative System

FIG. 1 illustrates a system 100 for automated exploration and navigation of a physical space 102 with an autonomous mobile device (AMD) 104 using markers based on image features, according to some implementations.

The AMD 104 is shown at a current location in the physical space 102. The physical space 102 may include a docking station 106. The AMD 104 may be configured to dock with or connect to the docking station 106. The docking station 106 may provide a known point in the physical space 102 to which the AMD 104 may return, electrical power, communications, or other functions.

One or more obstacles 108 may be present within the physical space 102. For example, obstacles 108 may comprise walls, furnishings, stair wells, people, and so forth. Obstacles 108 may be static, quasi-static, or dynamic. For example, a wall that does not move is a static obstacle. In comparison, a door that swings between open and closed states is a quasi-static obstacle 108. A dynamic obstacle might be a toy car that may move from one location to another.

The AMD 104 may include one or more sensors 110. For example, the sensors 110 may include cameras, microphones, time-of-flight (TOF) sensors, LIDAR, and so forth. Different sensors 110 may have different fields of view (FOV). For example, a first sensor FOV 112 for a pair of cameras is depicted as is a second (closer) sensor FOV 112 for a time-of-flight depth sensor.

During operations, the sensors 110 provide sensor data 114. For example, the cameras may provide image data 116 comprising one or more images of the physical space 102. In other implementations other sensors, such as a LIDAR, may provide sensor data 114. The sensors 110 are discussed in more detail with regard to FIG. 3.

While moving from one location to another, the AMD 104 needs to determine where it is at a given time, determine the location of obstacles 108, and move while avoiding collisions with any of these obstacles 108. A command to move may be the result of input from the user, a previously scheduled task, a response to input from one or more sensors 110, a command from an external computing device, or another source.

A mapping module 118 determines a representation of the physical space 102 that includes the obstacles 108 and their location in the physical space 102. During operation the mapping module 118 uses the sensor data 114 from various sensors 110 to determine information such as where the AMD 104 is, how far the AMD 104 has moved, the presence of obstacles 108, where those obstacles 108 are, and so forth.

Figure 5:
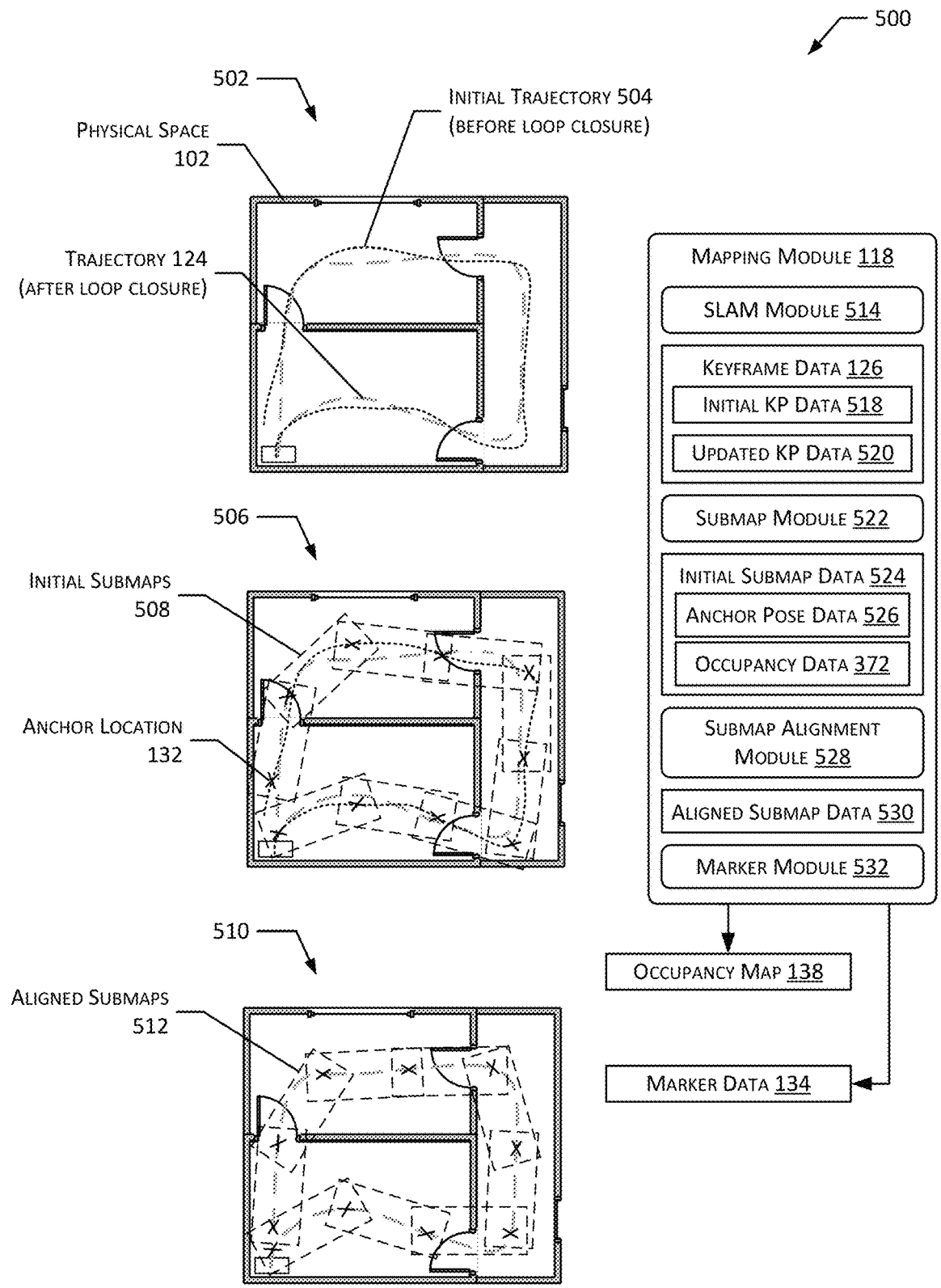
FIG. 5 illustrates the physical space, trajectories, and associated submaps before and after loop closure, according to some implementations.

The mapping module 118 uses a simultaneous localization and mapping (SLAM) module 514 (see FIG. 5.). Localization is determining where the AMD 104 is in the physical space 102 and may utilize an external reference. The sensors 110 include one or more cameras which acquire the image data 116 comprising one or more images. These images are processed to determine feature data 120 that is indicative of, and characterizes, features 122 in the images, such as edges of doors, shadows on the wall, texture on the walls, and so forth. In other implementations, the features 122 may comprise data obtained from other sensors. For example, the features 122 may comprise geometry of a scene as provided by a LIDAR, radar, and so forth.

A descriptor is information that describes a particular feature 122 or set of features 122. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature 122 with respect to 256 different dimensions. Descriptors regarding the features 122 present in a given image or set of images in the image data 116 may be stored as feature data 120. In one implementation the descriptors may include information about the relative placement, with respect to the image, of a particular feature 122. In another implementation the feature data 120 may comprise a graph that describes a relationship of the apparent location of features 122 with respect to one another in a given image or set of image data 116.

Because the feature data 120 represents the features 122 seen by the camera that is at a particular location in the physical space 102 and pointed in a particular direction, the feature data 120 is associated with a particular location in the physical space 102 and corresponding orientation of the camera. The features 122 in the feature data 120 are thus associated with a particular location in the physical space 102, and vice versa. As described below, a marker may be determined that is associated with the particular location in the physical space 102, with respect to the features 122.

The feature data 120 may be representative of features 122 observed with different types or levels of illumination. For example, the feature data 120 may be determined by acquiring and processing a first image with first illumination and a second image with second illumination. The first and second illumination may differ in one or more of intensity or type.

The AMD 104 may move through the physical space 102. The motion of the AMD 104 may be described as a trajectory 124, such as shown here. In some implementations the trajectory 124 may comprise a series of poses. Each pose may be indicative of a particular location with respect to a plurality of orthogonal axes and rotation with respect to individual ones of the axes. For example, the pose may comprise six dimensional (6D) information indicative of coordinates in three-dimensional space with respect to a designated origin, and rotation with respect to each of the three axes.

While the AMD 104 is moving, the SLAM module 514 may provide as output a series of poses, each pose describing a location and rotations in the physical space 102. In one implementation each pose may be based at least in part on the apparent motion of observed features 122 in the images. For example, from image to image at least some of the features 122 that are described by descriptors in the feature data 120 will be in common. By determining the relative difference in apparent position in the image of the same feature 122 as observed by two different cameras at the same time, the location of a camera with respect to the feature 122 in the physical space 102 may be determined. During successive times, as the AMD 104 moves and additional images are acquired from locations in the physical space 102, the apparent change in position of the same feature 122 across the additional images may be used to determine subsequent poses. In some implementations a pose may comprise information about six dimensions (6D), that of three orthogonal axes and corresponding rotations about those axes. The SLAM module 514 may also use data from other sensors 110 such as motor encoders, inertial measurement units (IMU) with one or more accelerometers and gyroscopes, LIDAR, and so forth. For example, inertial data indicative of rotations, accelerations along particular axes, and so forth obtained from the IMU may be integrated to provide information about the movement of the AMD 104. In another example, sensor data 114 from the LIDAR may be used instead of, or in addition to, the image data 116. The features 122 may be determined from the sensor data 114 provided by the LIDAR.

A set of poses generated by the SLAM module 514 over time describe the trajectory 124. For example, trajectory data may comprise a time series of pose data from the SLAM module 514.

During operation of the AMD 104, various factors introduce uncertainty into the poses provided by the SLAM module 514. These factors may include sensor noise, changing lighting conditions that change the appearance of features 122 in images, dynamic obstacles such as people moving through the physical space 102, and so forth. This uncertainty may manifest as apparent drift of the poses with respect to the physical space 102. As the AMD 104 moves through the physical space 102, the uncertainty accumulates. For example, if the AMD 104 starts at the docking station 106, moves around the physical space 102, and returns to that docking station 106, due to drift the AMD 104 may determine that the location of the docking station 106 has changed even though the docking station 106 has remained stationary.

To address this issue, the AMD 104 may utilize a technique known as loop closure. With loop closure, the AMD 104 recognizes it has returned to a previously visited area, thus "closing a loop" that returns the AMD 104 to about the same place in the physical space 102. For loop closure to occur, the AMD 104 does not need to assume a pose identical to a previously obtained pose, but rather needs to be close enough that the features 122 associated with that pose can be obtained by the cameras and determined. To facilitate loop closure, an assumption can be made that fixed objects have not been moved since the last visit. The loop closure process provides an updated trajectory which attempts to correct for drift.

The SLAM module may designate some images and their associated feature data 120 of descriptors of features 122 as "keyframes", and each keyframe has an associated keyframe pose that indicates the location and orientation of the AMD 104 that corresponds to the keyframe. Keyframe data 126 may be stored that includes the pose and the feature data 120 including descriptors associated with the pose at a keyframe location 128. Before loop closure this pose information is initial keyframe pose (KP) data 518. The keyframe data 126 is representative of a location where the AMD 104 has been. After loop closure, the updated pose information about a particular keyframe is updated KP data 520. Operation of the SLAM module is described in more detail with regard to FIG. 7.

Keyframes may be designated based on distance, time, changing features 122 in the image data 116, and so forth. For example, a keyframe may be designated every 3 seconds. During operation, the SLAM module 514 may compare current information such as pose and descriptors with keyframe data 126 such as initial KP data 518 to determine if the AMD 104 has previously visited that place in the physical space 102. If the count of features in the current keyframe data 126 that correspond to features 122 in previously stored keyframe data 126 exceeds a threshold, the AMD 104 may be deemed to have returned to a previously determined keyframe location 128. This may trigger the loop closure process, as described above. Completion of the loop closure process results in the determination of the updated KP data 520. As a result, information about the pose associated with each keyframe initially (before loop closure) and updated (after loop closure) is available.

While the AMD 104 is moving, other sensors 110 are acquiring information about the physical space 102. One or more sensors 110 may acquire depth data about the presence or absence of obstacles 108 in the physical space 102. For example, the sensors 110 may comprise a time-of-flight (TOF) depth camera, ultrasound, radar, and so forth. The depth data is indicative of whether an obstacle 108 is detected or not, and also includes information about the distance between the sensor 110 and the obstacle 108 and relative direction with respect to the sensor 110 of an obstacle 108, if detected.

The mapping module 118 may determine submaps that are associated with anchor data 130 indicative of anchor locations 132. The anchor locations 132 are representative of a location where the AMD 104 has been. A submap may comprise data that is representative of a portion of the physical space 102 that is indicative of the presence or absence of obstacles 108 as determined by the depth data acquired from sensors 110 such as a TOF depth camera. The mapping module 118 may determine when to designate a submap based on occurrence of a trigger, such as distance travelled. Submaps are discussed in more detail with regard to FIG. 5.

The mapping module 118 may generate initial submap data indicative of an initial submap. The initial submap data may comprise initial anchor pose data indicative of an anchor location 132 and occupancy data 372 associated with the submap. For ease of discussion, initial submaps are those with initial anchor poses based on initial keyframe poses. Each submap is associated with at least two anchor poses, each having a respective anchor location 132.

When the trigger determines a second initial submap is to be generated, a second initial keyframe pose associated with that point in time or location is used to create or designate an initial exit anchor pose for the first initial submap. That initial exit anchor pose may be duplicated or otherwise used as the initial entry anchor pose for the second initial submap. In this fashion, the submaps may be "daisy chained" together, each subsequent submap sharing a common anchor pose with a preceding submap. The initial anchor pose data comprises information about the initial entry anchor pose and the initial exit anchor pose. The occupancy data 372 may comprise information indicative of an area in the physical space 102, as represented by the submap, that contains an obstacle 108 or is determined to be free from obstacles 108.

As mentioned above, drift accumulates, resulting in some uncertainty as to where the poses produced by the SLAM module 514 are with respect to the physical space 102 and one another. As a result, the initial KP data 518, and corresponding initial anchor poses in the initial submap data that are based on those initial keyframe poses drift as well. If uncorrected, this drift could result in an incorrect mapping of the physical space 102. For example, drift may result in a door being misplaced, a wall being incorrectly placed in two different locations, and so forth.

When a loop closure takes place, the updated KP data 520 is determined along with the updated trajectory that is based on the updated keyframe poses. For example, compared to an initial keyframe pose, an updated keyframe pose may have one or more of location or orientation changed by translation or rotation to a different set of coordinates. The updated keyframe pose still represents the same place in the physical space 102, but the updated keyframe pose may differ from the initial keyframe pose with respect to at least one degree of freedom.

Each submap has at least two anchor poses that are based on keyframe poses. The initial submap data 524 is based on initial KP data 518. A submap alignment module 528 uses the initial anchor pose data based on the initial KP data 518 and the updated anchor pose data based on the updated KP data 520 to determine transform data.

The transform data, such as a transform matrix, may then be applied to the initial submap data 524 to determine the aligned submap data 530. For example, this may be envisioned as rotating and translating, as needed, the initial submap so the initial anchor poses align with the updated anchor poses. In some implementations, for this transform the submap may be considered to be rigid.

The aligned submap data is now aligned to the updated trajectory. When combined with the other aligned submaps, occupancy data may be determined and used to generate an occupancy map 138. For example, the mapping module 118 may merge or otherwise combine the data from the aligned submap data to produce an occupancy map 138.

The occupancy map 138 may comprise data that indicates the location of one or more obstacles 108, such as a table, wall, stairwell, and so forth. In some implementations, the occupancy map 138 may comprise a plurality of cells 148 with each cell of the plurality of cells representing a particular area in the physical space 102. Data, such as occupancy values, may be stored that indicates whether an area of the physical space 102 associated with the cell is unobserved, occupied by an obstacle 108, or is unoccupied. An obstacle 108 may comprise an object or feature that prevents or impairs traversal by the AMD 104. For example, an obstacle 108 may comprise a wall, stairwell, and so forth.

The occupancy map 138 may be manually or automatically determined. For example, during a learning phase the user may take the AMD 104 on a tour of the physical space 102, allowing the mapping module 118 of the AMD 104 to determine the submap data described above. The user may provide input data 346 such as tags designating a particular obstacle type, such as "furniture" or "fragile". In another example, during subsequent operation, the AMD 104 may generate the occupancy map 138 that is indicative of locations and types of obstacles such as chairs, doors, stairwells, and so forth as it moves unattended through the physical space 102. In some implementations, an exploration module 140 as described below may be used to determine the occupancy map 138.

The mapping module 118 may determine marker data 134 indicative of one or more marker locations 136. A marker comprises marker data 134 that represents a marker location 136 in the physical space 102 with respect to a set of one or more features 122 that have been observed in an image. The marker location 136 may be a location that the AMD 104 has previously visited, a location that the AMD 104 has never visited, or a location that is inaccessible to the AMD 104. In one implementation the marker data 134 describes a marker location 136 with respect to a datum location, such as one or more anchors or keyframes. For example, marker data 134 may describe a marker with respect to an anchor at an anchor location 132 indicated in the anchor data 130. Because the marker data 134 is indicative of a particular set of feature data 120 and the relative arrangement of the features 122 as described by that data, the marker data 134 is representative of the marker location 136, a particular point in the physical space 102. The marker location 136 may be associated with a particular set of coordinates with respect a particular version or iteration of the occupancy map 138, but is independent of the occupancy map 138. For example, as loop closures occur and portions of the occupancy map 138 are shifted, the marker is invariant and remains associated with the same marker location 136 over time. This persistence and consistency over time with respect to the physical space 102 is very useful for exploration and navigation.

As mentioned earlier, the sensors 110 on the AMD 104 or in the physical space 102 acquire the sensor data 114. The sensor data 114 is processed to determine information such as a current location of the AMD 104 in the physical space 102 and to provide the information that is used to determine the occupancy map 138. The sensors 110 exhibit various limitations, including a particular sensor FOV 112, working range, may require line of sight to operate, exhibit sensor blind spots, and so forth. Except for very unusual circumstances such as very simple physical spaces 102, the sensors 110 are not able to simultaneously sense all of the areas in the physical space 102. As a result, the AMD 104 has to explore the physical space 102 by moving and directing the sensor FOV 112 of the sensors 110 so that sensor data 114 about the physical space 102 can be obtained. This sensor data 114 is then processed to determine the occupancy map 138.

An exploration module 140 directs the AMD 104 to explore the physical space 102 in order to gather sensor data 114 and subsequently create or update the occupancy map 138. Exploration may take place in different situations. For example, when the AMD 104 is first introduced into the physical space 102, exploration is necessary to generate the occupancy map 138 for the first time. Likewise, the physical space 102 may change over time, so the AMD 104 may periodically explore at least part of the physical space 102 to update an existing occupancy map 138. The exploration module 140 uses markers to quickly and efficiently explore the physical space 102 while minimizing or eliminating duplicative attempts to re-explore a part of the physical space 102 that is not observable.

The exploration module 140 determines where to move the AMD 104 and which direction to point the sensor FOV 112 to explore the physical space 102 and produce an occupancy map 138 in which, in the ideal circumstance, the unobserved cells are at a minimum or zero.

A frontier is a region of the physical space 102 that is associated with the boundary between observed cells and the unobserved cells. In one implementation, a frontier cell is an unobserved cell that is immediately adjacent to an observed cell. A frontier region may comprise a plurality of frontier cells that are adjacent to one another.

The exploration module 140 may use one or more parameters to determine the frontier cell data that indicates where the frontier cells are. Determination of the frontier cell data 350 is discussed in more detail with regard to FIG. 8.

The frontier cell data is then used to determine observation target (OT) cell data that is indicative of an OT cell on or near the frontier. Goal pose data is determined that specifies a cell from which the OT cell is to be observed and orientation to see the OT cell. The orientation is determined to direct the sensor FOV 112 from the goal cell to, and past, the physical space 102 associated with the OT cell.

If the exploration module 140 is unable to determine goal pose data for the OT cell that meets goal pose parameters, a first marker associated with the OT cell may be added to block list data 142. For example, a marker location 136 may be determined that is closest to the OT cell in the current occupancy map 138. The marker data 134 associated with the information about the OT cell may be stored in OT block list data. Because a marker location 136 is used, subsequent attempts to explore benefit from the marker's invariability with respect to the physical space 102. Even if the coordinates of the OT cell are subsequently changed due to a loop closure process, the first marker continues to be associated with the same marker location 136 in the physical space 102.

During operation, the exploration module 140 determines the OT cell data and the goal pose data, an autonomous navigation module 144 is used to try and move the AMD 104 to the goal pose. For example, a second marker is determined that is associated with the goal pose indicated in the goal pose data. If the AMD 104 is unable to position itself at the physical space 102 and orientation associated with the second marker, or the physical space associated with the first marker of the OT cell is unobservable from the goal pose, then one or more of the first marker associated with OT cell or the second marker associated with the goal pose may be added to the block list data 142.

During subsequent operation, the exploration module 140 will avoid the use of markers indicated in the block list data 142 for observation targets or goal poses. By avoiding the marker locations 136 in the block list data 142, the exploration module 140 reduces or eliminates duplicative and unproductive movements and acquisition of sensor data 114. Operation of the exploration module 140 is discussed in more detail below with regard to FIG. 8.

The autonomous navigation module 144 provides the AMD 104 with the ability to navigate within the physical space 102 without real-time human interaction. A command to move may be the result of an input from the user, a previously scheduled task, responsive to input from one or more sensors 110, a command from an external computing device, or another source. The autonomous navigation module 144 may implement, or operate in conjunction with, the mapping module 118 to determine one or more of the occupancy map 138, a navigation map 348, or other representations of the physical space 102. The autonomous navigation module 144 is discussed in more detail with regard to FIG. 3.

The AMD 104 autonomous navigation module 144 may generate path plan data 356 that is indicative of a path through the physical space 102 from the current location to the destination location. The AMD 104 may then begin moving along the path.

While moving along the path, the AMD 104 may assess the physical space 102 and update or change the path as appropriate. For example, if an obstacle 108 appears in the path, the mapping module 118 may determine the presence of the obstacle 108 as represented in the occupancy map 138 and navigation map 348. The now updated navigation map 348 may then be used to plan an alternative path to the destination location.

The autonomous navigation module 144 may navigate to a specified marker. For example, a third marker with associated marker data 134 indicative of a marker location 136 may be specified. The autonomous navigation module 144 may be directed to navigate the AMD 104 to the marker location 136 associated with the third marker. This allows the AMD 104 to return to a particular location that remains accessible in the physical space 102, even if a change has been made to the occupancy map 138.

As shown in FIG. 1, a first occupancy map 138(1) contains some errors with regard to the physical space 102. For example, the walls do not meet with the square corners and the position of some walls are not correct. A first location of the AMD 104 with respect to the first occupancy map 138(1) is shown as pose 146(1) having coordinates of X=5 and Y=39 with an orientation of 35. A marker location 136(1) is shown with regard to the first occupancy map 138(1). For example, the marker location 136(1) may comprise a user specified location that is described by first marker data 134(1).

As the mapping module 118 continues to operate and the exploration module 140 directs the AMD 104 to explore the physical space 102, one or more loop closures are completed and a second occupancy map 138(2) has been determined. In this illustration, the second occupancy map 138(2) is a more accurate representation of the physical space 102. The marker location 136(1), originally defined while the first occupancy map 138(1) was in use, remains valid and usable, indicating the user specified location with respect to the features 122 observed in the image data 116 that was obtained at or near the marker location 136(1). Continuing the example illustrated here, the AMD 104 is present at the same marker location 136(1) which corresponds to the same location in the physical space 102. However, a second location of the AMD 104 with respect to the second occupancy map 138(2) is shown as a second pose 146(2) having coordinates of X=6 and Y=37 with an orientation of 39. The first pose 146(1) and the second pose 146(2) may have different coordinates due to changes in the occupancy map 138, but the use of the first marker and associated marker data 134 allows the AMD 104 to return to, or avoid if on the block list data 142, a particular location in the physical space 102.

Distances in this disclosure may be described with regard to a distance in the physical space 102, with regard to a representation such as an occupancy map 138 or navigation map 348, and so forth. For example a distance between a first cell 148(1) and a second cell 148(2) may be calculated as a distance in the physical space 102 as measured from a first center of a first area in the physical space 102 associated with the first cell 148(1) and a second center of a second area in the physical space 102 associated with the second cell 148(2), such as "0.35 meters". In another example, the same distance between the first cell 148(1) representing the same first area as above and the second cell 148(2) representing the same second area as above may be expressed in units of cells 148, such as "7 cells". In situations where the cells 148 are associated with a fixed dimension with respect to the physical space 102, distances may be converted between the physical space 102 and the representations by the cells 148 using a conversion factor. For example, if each cell 148 describes a 5 cm square area within the physical space 102, a horizontal or vertical distance of "one cell" equals 5 cm.

Distances may be calculated between points, centers, vertices, and so forth. For example, a distance may be calculated between edges of the cells 148 or the areas in the physical space 102 associated with those cells 148. In some implementations, with regard to representations such as the occupancy map 138 or the navigation map 348, distances may be determined as straight line distances from one cell 148 to another, or as rectilinear distance, also known as a "taxicab distance".

Figure 3:
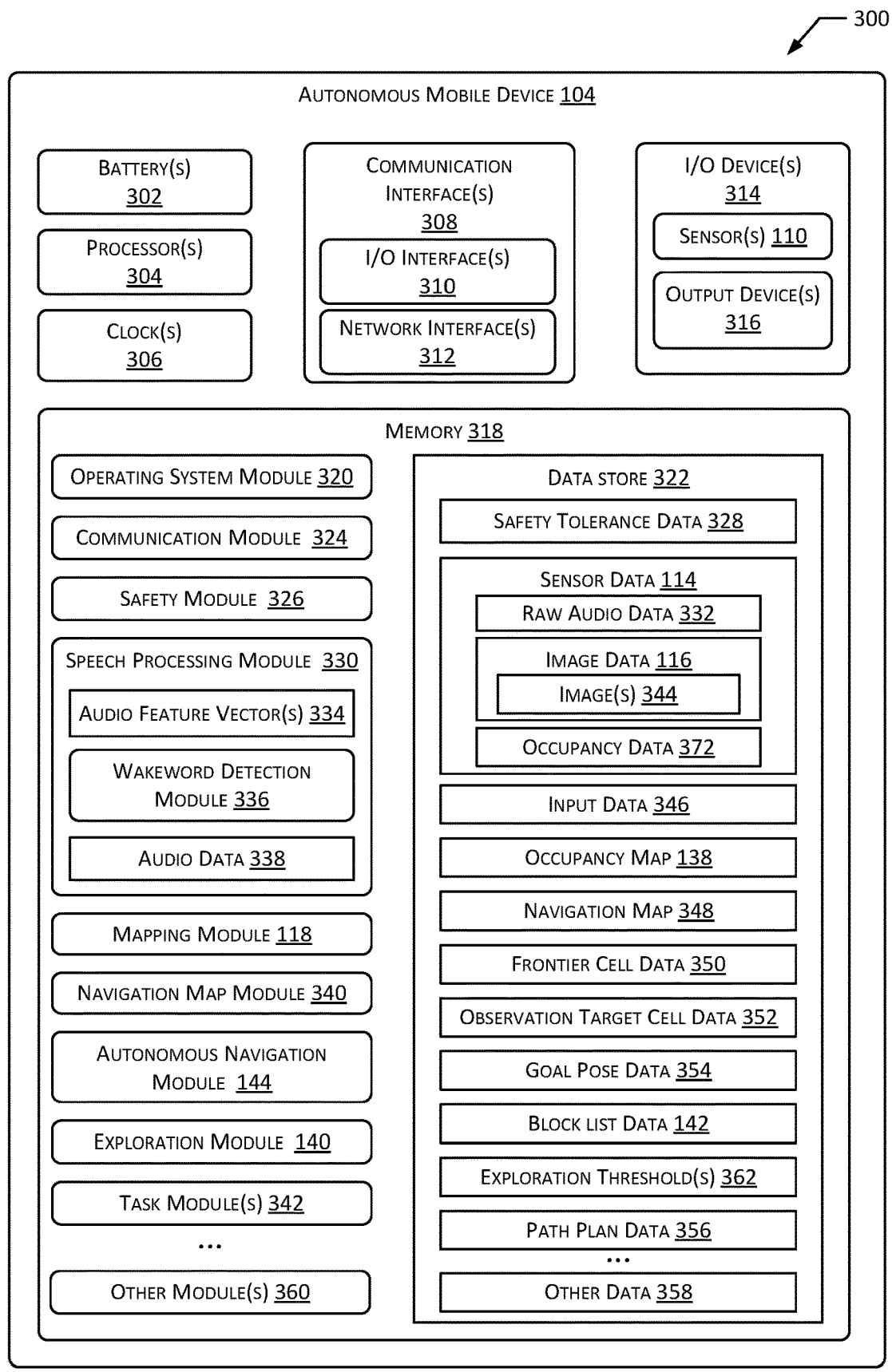
FIG. 3 is a block diagram of the components of the AMD, according to some implementations.
Figure 4:
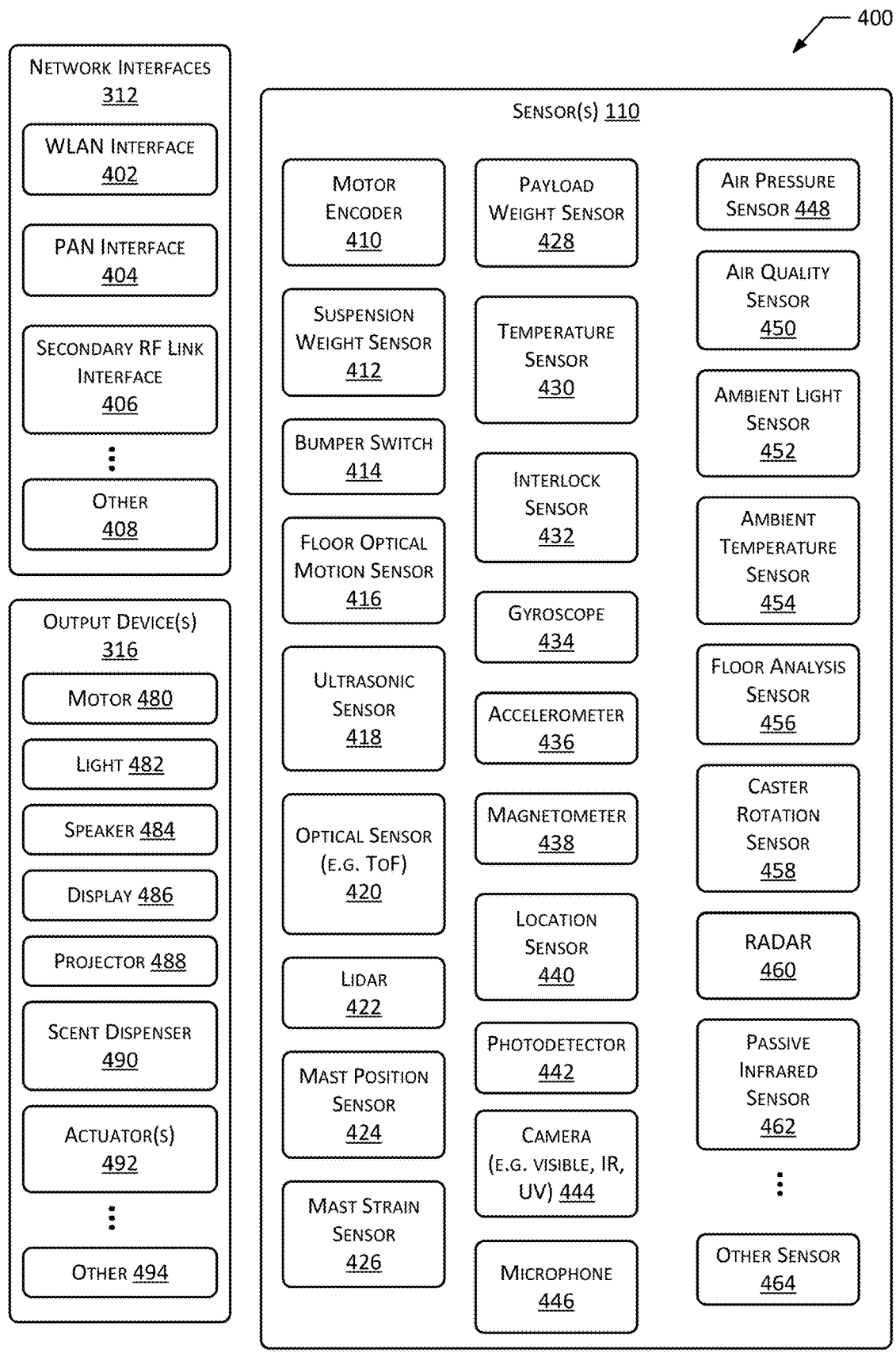
FIG. 4 is a block diagram of some components of the AMD, such as network interfaces, sensors, and output devices, according to some implementations.

Components of the AMD 104 are described in more detail with regard to FIGS. 3 and 4.

Modules described herein, such as the mapping module 118, may provide various processing functions such as de-noising, filtering, and so forth. Processing of sensor data 114, such as image data 116 from a camera, may be performed by a module implementing, at least in part, one or more of the following tools or techniques. In one implementation, processing of image data 116 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 114. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 114 or other data. For example, the ANN may be trained using a supervised learning algorithm such that object identifiers are associated with images of particular objects within training images provided to the ANN. Once trained, the ANN may be provided with the sensor data 114 and produce output indicative of the object identifier.

Figure 2:
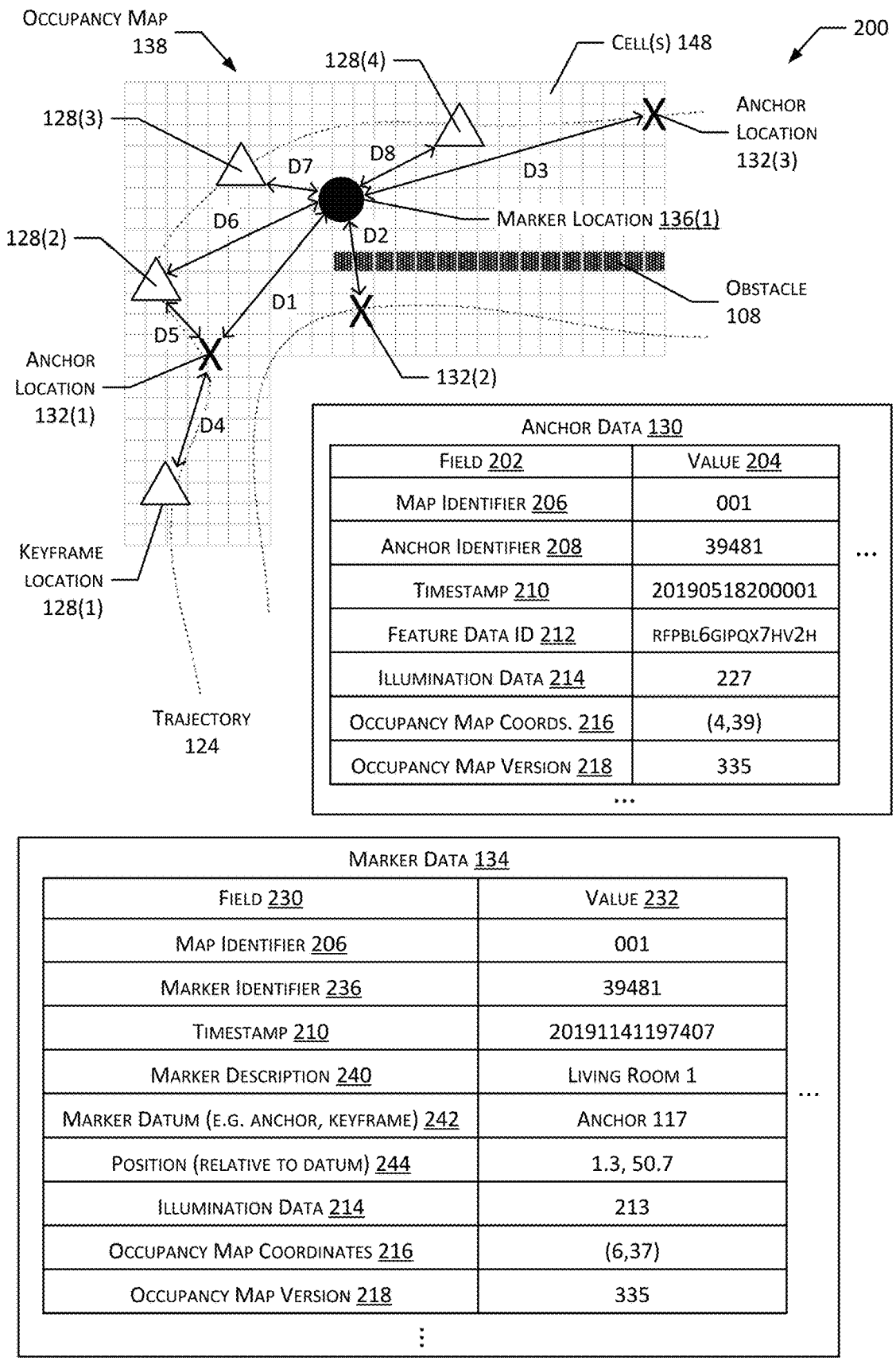
FIG. 2 illustrates a diagram of a portion of an occupancy map, keyframe locations, anchor locations, anchor data, a marker location, and marker data, according to some implementations.

FIG. 2 illustrates a diagram 200 of a portion of an occupancy map 138, keyframe locations 128, anchor locations 132, anchor data 130, a marker location 136, and marker data 134, according to some implementations.

In this illustration, a portion of an occupancy map 138 is depicted comprising a plurality of cells 148. Some cells 148 indicate the presence of an obstacle 108, as indicated with a dark shading.

During operation, the mapping module 118 determines a plurality of keyframe locations 128(1), 128(2), 128(3), and 128(4) and their associated keyframe data 126 as the AMD 104 moves along the trajectory 124. The keyframe locations 128 are thus representative of prior locations of the AMD 104 in the physical space 102.

The mapping module 118 also determines during operation a plurality of anchor locations 132(1), 132(2), and 132(3) and their associated anchor data 130 as described above. An example of anchor data 130 is depicted and described in more detail below.

The mapping module 118 may determine marker data 134 responsive to a user input, external process, or internal process. For example, the mapping module 118 may designate a marker and associated marker data 134 upon recognizing an object in the physical space 102 such as "west window". In another example, the mapping module 118 may designate a marker responsive to receiving a user input.

A marker may be specified with respect to one or more datum locations. A datum location may comprise an anchor, keyframe, and so forth. In one implementation, a marker may be specified with respect to a previously determined anchor specified by anchor data 130. An anchor may be selected that has an anchor location 132 that is geometrically closest to the marker location 136. In some implementations, an anchor location 132 may be selected for which no obstacle 108 is present between the marker location 136 and the anchor location 132. For example, the selected anchor may be closest and have an unobstructed line of sight between the marker location 136 and the anchor location 132. In other implementations, an anchor location 132 that is not within an unobstructed line of sight may be used. The marker location 136 need not be along the trajectory 124. The marker location 136 may be at a location that has been visited by the AMD 104, may be at an unvisited location, or may be at a location which is inaccessible to the AMD 104. For example, a marker location 136 may be designated that is in the center of a couch where the AMD 104 is unable to travel to.

In the example illustrated here, the marker location 136(1) is shown and there are three anchor locations 132(1), 132(2), and 132(3). Distances D1, D2, and D3 indicate the distances between the marker location 136(1) and the respective anchor locations 132(1), 132(2), 132(3). In this illustration D2<D1<D3, placing anchor location 132(2) closest to the marker location 136(1). However, D2 is unable to be used as there is an obstacle 108 between the marker location 136(1) and the anchor location 132(2). Instead, anchor location 132(1) may be used as a datum location for the marker as D1 is <D3 and no obstacle 108 is present between the anchor location 132(1) and the marker location 136(1).

The anchor data 130 may comprise one or more fields 202 and corresponding values 204. For example, the fields 202 of the anchor data 130 may comprise one or more of a map identifier 206, anchor identifier 208, timestamp 210, feature data identifier (ID) 212, illumination data 214, occupancy map coordinates 216, occupancy map version 218, and so forth. The map identifier 206 may indicate the particular map that the anchor in the anchor data 130 is associated with. For example, a multi-level home may have a different map identifier 206 to represent a different map for each level. The anchor identifier 208 may comprise data used to designate a particular set of anchor data 130 that is representative of a particular anchor. The timestamp 210 may comprise data indicative of a time associated with the anchor data 130, such as a date and time of when the anchor was created. The feature data ID 212 may indicate feature data 120 or a subset of features 122 that are associated with the particular anchor data 130. The illumination data 214 may comprise data indicative of an illumination level associated with the feature data 120. For example, the illumination data 214 may be based on data obtained by an ambient light sensor when the image data 116 used to determine the feature data 120 was obtained. The occupancy map coordinates 216 indicate coordinates with respect to the occupancy map 138 version as indicated by the occupancy map version 218. For example, the occupancy map version 218 may be incremented with each loop closure that results in a change to the occupancy map 138.

In some implementations the anchor data 130 may be based at least in part on keyframe data 126. When an anchor location 132 is specified a determination is made to find the closest keyframe location 128. For example, keyframe location 128(2) is closest to anchor location 132(1). For example, the keyframe location 128(2) is closest along the trajectory 124 to the anchor location 132(1). The feature data 120 associated with keyframe location 128(2) may be used to determine the anchor data 130. In one implementation this may comprise copying or referring to the feature data 120 of the keyframe location 128(1). In another implementation the anchor data 130 may be specified as a relationship with respect to the closest keyframe data 126. For example, the anchor data 130 may specify translation with respect to three orthogonal axes and rotation with respect to each of those three orthogonal axes of the anchor location 132 relative to the keyframe location 128.

The marker data 134 may comprise one or more fields 230 and corresponding values 232. For example, the fields 230 of the marker data 134 may comprise one or more of the map identifier 206, a marker identifier 236, a timestamp 210, a marker description 240, a marker datum 242, a position (relative to the datum location) 244, illumination data 214, occupancy map coordinates 216, occupancy map version 218, and so forth. For example, the marker identifier 236 may comprise data used to designate a particular set of marker data 134 that is representative of a particular marker. The marker description 240 may comprise information associated with the marker, such as a description provided by a user.

The marker datum 242 provides data indicative of a particular datum, such as an anchor specified by anchor data 130 or a keyframe specified by keyframe data 126. For example, the marker datum 242 may indicate an anchor identifier 208, a keyframe identifier, and so forth. In some implementations a plurality of marker datums 242 may be associated with a marker. For example, if the datum used is a keyframe then keyframe data 126 associated with the same keyframe location 128, or within a threshold distance, as obtained during different illumination conditions may be used. Continuing the example, the marker may be associated with first keyframe data 126 associated with a first illumination level and second keyframe data 126 associated with a second illumination level.

The position (relative to a datum location) 244 may indicate an offset or displacement, relative to the datum location, of the marker location 136. For example, the position 244 may specify polar coordinates such as a distance and angle that describe the marker location 136 relative to the anchor specified by the anchor identifier 208. In another example, the anchor data 130 may comprise a rigid transform that specifies a translation with respect to three orthogonal axes and rotation with respect to each of those three orthogonal axes of the anchor location 132 relative to the keyframe location 128. In other implementations, other transforms may be used.

In one implementation, the marker may "snap" to a particular datum location, such as a closest anchor location 132 or keyframe location 128 that is closest and unobstructed by an obstacle 108. In this implementation, the resulting marker is coincident with the datum location such that the marker location 136 and the anchor location 132 are identical. For example, the marker may include a copy of, or a reference to, the feature data 120 of an anchor. This implementation is computationally efficient during creation as subsequently the determination and storage of the position 244 may be eliminated or set to zero or null.

In the event that a datum location associated with a marker location 136 is deleted or rendered unavailable, the marker location 136 may be associated with another datum location that is available. For example, if anchor location 132(1) is deleted, anchor location 132(2) may be used as the datum location for the marker location 136(1). For example, a closest available anchor location 132 may be selected.

During operation of the system, the occupancy map coordinates 216 and occupancy map version 218 associated with a particular marker may change. For example, following a loop closure event the values 232 of the occupancy map coordinates 216 for a particular marker may be updated to values based on the most recent occupancy map 138.

The marker data 134 may include additional information. For example, a quality metric may be determined that is indicative of quality or reliability of the marker location 136 with respect to the datum location. For example, a quality metric may be greater for a first datum location that is within line of sight as compared to a second datum location that not within line of sight. In other examples, the quality metric may be based at least in part on distance from the marker location 136 to the datum location, quantity of features 122 associated with the datum location, elapsed time since the datum location was determined, and so forth.

The marker data 134 may be maintained in memory 318 and used at a later time. For example, marker data 134 associated with a landmark may be stored and maintained over a period of time of days, months, years, or indefinitely. In some implementations the exploration module 140 may remove or purge from storage in the memory 318 at least a portion of the marker data 134.

FIG. 3 is a block diagram 300 of the AMD 104, according to some implementations. The AMD 104 may include one or more batteries 302 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more hardware processors 304 (processors) configured to execute one or more stored instructions. The processors 304 may comprise one or more cores. The processors 304 may include microcontrollers, systems on a chip, field programmable gate arrays, digital signal processors, graphic processing units, general processing units, and so forth.

One or more clocks 306 may provide information indicative of date, time, ticks, and so forth. For example, a processor 304 may use data from the clock 306 to associate a particular time with an action, sensor data 114, and so forth.

The AMD 104 may include one or more communication interfaces 308 such as input/output (I/O) interfaces 310, network interfaces 312, and so forth. The communication interfaces 308 enable the AMD 104, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 110, keyboard, mouse, scanner, and so forth. The I/O devices 314 may also include output devices 316 such as one or more of a motor, light, speaker, display, projector, printer, and so forth. In some embodiments, the I/O devices 314 may be physically incorporated with the AMD 104 or may be externally placed.

The network interfaces 312 may be configured to provide communications between the AMD 104 and other devices such as other AMDs 104, docking stations 106, routers, access points, and so forth. The network interfaces 312 may include devices configured to couple to personal area networks (PANs), local area networks (LANs), wireless local area networks (WLANS), wide area networks (WANs), and so forth. For example, the network interfaces 312 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 3, the AMD 104 includes one or more memories 318. The memory 318 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 318 provides storage of computer-readable instructions, data structures, program modules, and other data for the operation of the AMD 104. A few example functional modules are shown stored in the memory 318, although the same functionality may alternatively be implemented in hardware, firmware, or as a system on a chip (SoC).

The memory 318 may include at least one operating system (OS) module 320. The OS module 320 is configured to manage hardware resource devices such as the I/O interfaces 310, the I/O devices 314, the communication interfaces 308, and provide various services to applications or modules executing on the processors 304. The OS module 320 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 318 may be a data store 322 and one or more of the following modules. These modules may be executed as foreground applications, background tasks, daemons, and so forth. The data store 322 may use a flat file, database, linked list, tree, executable code, script, or other data structure to store information. In some implementations, the data store 322 or a portion of the data store 322 may be distributed across one or more other devices including other AMDs 104, servers, network attached storage devices, and so forth.

A communication module 324 may be configured to establish communication with other devices, such as other AMDs 104, an external server, a docking station 106, and so forth. The communications may be authenticated, encrypted, and so forth.

Other modules within the memory 318 may include a safety module 326, a speech processing module 330, the mapping module 118, a navigation map module 340, the autonomous navigation module 144, the exploration module 140, one or more task modules 342, or other modules 360. The modules may access data stored within the data store 322, including safety tolerance data 328, sensor data 114, input data 346, one or more occupancy maps 138, one or more navigation maps 348, frontier cell data 350, observation target cell data 352, goal pose data 354, block list data 142, exploration thresholds 362, path plan data 356, other data 358, and so forth.

The sensor data 114 may comprise raw audio data 332 obtained by one or more microphones 446. The image data 116 is obtained by one or more cameras 444 and may comprise one or more images 344. The sensor data 114 may also include occupancy data 372.

The exploration module 140, the observation target (OT) cell data 352, the goal pose data 354, the block list data 142, and the exploration thresholds 362 are described in more detail with regard to FIGS. 8-11.

The safety module 326 may access the safety tolerance data 328 to determine within what tolerances the AMD 104 may operate safely within the physical space 102. For example, the safety module 326 may be configured to stop the AMD 104 from moving when an extensible mast of the AMD 104 is extended. In another example, the safety tolerance data 328 may specify a minimum sound threshold which, when exceeded, stops all movement of the AMD 104. Continuing this example, detection of sound such as a human yell would stop the AMD 104. In another example, the safety module 326 may access safety tolerance data 328 that specifies a minimum distance from an object that the AMD 104 is to maintain. Continuing this example, when a sensor 110 detects an object has approached to less than the minimum distance, all movement of the AMD 104 may be stopped.

One or more motors 480 or other actuators enable the AMD 104 to move from one location in the physical space 102 to another. For example, a motor 480 may be used to drive a wheel attached to a chassis of the AMD 104, which causes the AMD 104 to move. The AMD 104 may turn, move forward, move backward, and so forth. Movement of the AMD 104 may be stopped by one or more of inhibiting operations of one or more motors 480, issuing a command to stop motor operation, disconnecting power from one or more the motors 480, and so forth. The safety module 326 may be implemented as hardware, software, or a combination thereof.

The safety module 326 may control other factors, such as a maximum speed of the AMD 104 based on information obtained by the sensors 110, precision and accuracy of the sensor data 114, and so forth. For example, detection of an object by an optical sensor may include some error, such as when the distance to an object comprises a weighted average between the object and a background. As a result, the maximum speed permitted by the safety module 326 may be based on one or more factors such as the weight of the AMD 104, nature of the floor, distance to the object, and so forth. In the event that the maximum permissible speed differs from the maximum speed permitted by the safety module 326, the lesser speed may be utilized.

The speech processing module 330 may be used to process utterances of the user. Microphones may acquire audio in the presence of the AMD 104 and may send raw audio data 332 to an acoustic front end (AFE). The AFE may transform the raw audio data 332 (for example, a single-channel, 16-bit audio stream sampled at 16 kHz), captured by the microphone, into audio feature vectors 334 that may ultimately be used for processing by various components, such as a wakeword detection module 336, speech recognition engine, or other components. The AFE may reduce noise in the raw audio data 332. The AFE may also perform acoustic echo cancellation (AEC) or other operations to account for output audio data that may be sent to a speaker of the AMD 104 for output. For example, the AMD 104 may be playing music or other audio that is being received from a network in the form of output audio data. To avoid the output audio interfering with the device's ability to detect and process input audio, the AFE or other component may perform echo cancellation to remove the output audio data from the input raw audio data 332, or other operations.

The AFE may divide the raw audio data 332 into frames representing time intervals for which the AFE determines a number of values (i.e., features) representing qualities of the raw audio data 332, along with a set of those values (i.e., a feature vector or audio feature vector 334) representing features/qualities of the raw audio data 332 within each frame. A frame may be a certain period of time, for example a sliding window of 25 ms of audio data 338 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 332, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 334 (or the raw audio data 332) may be input into a wakeword detection module 336 that is configured to detect keywords spoken in the audio. The wakeword detection module 336 may use various techniques to determine whether audio data 338 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 336 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 336 may compare audio data 338 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 338 (which may include one or more of the raw audio data 332 or the audio feature vectors 334) to one or more server(s) for speech processing. The audio data 338 corresponding to audio obtained by the microphone may be processed locally on one or more of the processors 304, sent to a server for routing to a recipient device, or may be sent to the server for speech processing for interpretation of the included speech (either for purposes of enabling voice-communications and/or for purposes of executing a command in the speech). The audio data 338 may include data corresponding to the wakeword, or the portion of the audio data 338 corresponding to the wakeword may be removed by the AMD 104 before processing by the navigation map module 340, prior to sending to the server, and so forth.

The speech processing module 330 may include or access an automated speech recognition (ASR) module. The ASR module may accept as input raw audio data 332, audio feature vectors 334, or other sensor data 114 and so forth and may produce as output the input data 346 comprising a text string or other data representation. The input data 346 comprising the text string or other data representation may be processed by the navigation map module 340 to determine the command to be executed. For example, the utterance of the command "robot, come here" may result in input data 346 comprising the text string "come here". The wakeword "robot" may be omitted from the input data 346.

The navigation map module 340 uses the occupancy map 138 as input to generate the navigation map 348. The navigation map module 340 may produce the navigation map 348 to inflate or enlarge the obstacles 108 indicated by the occupancy map 138. One or more inflation parameters may be used during operation. The inflation parameters provide information such as inflation distance, inflation adjustment values, and so forth. In some implementations the inflation parameters may be based at least in part on the sensor FOV 112, sensor blind spot, physical dimensions of the AMD 104, and so forth.

The autonomous navigation module 144 provides the AMD 104 with the ability to navigate within the physical space 102 without real-time human interaction. The autonomous navigation module 144 may implement, or operate in conjunction with, the mapping module 118 to determine the occupancy map 138, the navigation map 348, or other representation of the physical space 102. In one implementation, the mapping module 118 may use one or more simultaneous localization and mapping ("SLAM") techniques. The SLAM algorithms may utilize one or more of maps, algorithms, beacons, or other techniques to navigate. The autonomous navigation module 144 may use the navigation map 348 to determine a set of possible paths along which the AMD 104 may move. One of these may be selected and used to determine path plan data 356 indicative of a path. For example, a possible path that is the shortest or has the fewest turns may be selected and used to determine the path. The path is then subsequently used to determine a set of commands that drive the motors 480 connected to the wheels. For example, the autonomous navigation module 144 may determine the current location within the physical space 102 and determine path plan data 356 that describes the path to a destination location such as the docking station 106.

The autonomous navigation module 144 may utilize various techniques during processing of sensor data 114. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 304, in response to a command received from one or more communication interfaces 308, as determined from the sensor data 114, and so forth. For example, an external server may send a command that is received using the network interface 312. This command may direct the AMD 104 to proceed to find a particular user, follow a particular user, and so forth. The AMD 104 may then process this command and use the autonomous navigation module 144 to determine the directions and distances associated with carrying out the command. For example, the command to "come here" may result in the task module 342 sending a command to the autonomous navigation module 144 to move the AMD 104 to a particular location near the user and orient the AMD 104 in a particular direction.

The AMD 104 may utilize one or more task modules 342. The task module 342 comprises instructions that, when executed, provide one or more functions. The task modules 342 may perform functions such as finding a user, following a user, present output on output devices 316 of the AMD 104, perform sentry tasks by moving the AMD 104 through the physical space 102 to determine the presence of unauthorized people, and so forth.

The AMD 104 may connect to the network using one or more of the network interfaces 312. In some implementations, one or more of the modules or other functions described here may execute on the processors 304 of the AMD 104, on the server, or a combination thereof. For example, one or more servers may provide various functions, such as ASR, natural language understanding (NLU), providing content such as audio or video to the AMD 104, and so forth.

The other modules 360 may provide other functionality, such as object recognition, speech synthesis, user identification, and so forth. The other modules 360 may comprise a speech synthesis module that is able to convert text data to human speech. For example, the speech synthesis module may be used by the AMD 104 to provide speech that a user is able to understand.

The data store 322 may store the other data 358 as well. For example, localization settings may indicate local preferences such as language, user identifier data may be stored that allows for identification of a particular user, and so forth.

FIG. 4 is a block diagram 400 of some components of the AMD 104 such as network interfaces 312, sensors 110, and output devices 316, according to some implementations. The components illustrated here are provided by way of illustration and not necessarily as a limitation. For example, the AMD 104 may utilize a subset of the particular network interfaces 312, output devices 316, or sensors 110 depicted here, or may utilize components not pictured. One or more of the sensors 110, output devices 316, or a combination thereof may be included on a moveable component that may be panned, tilted, rotated, or any combination thereof with respect to a chassis of the AMD 104.

The network interfaces 312 may include one or more of a WLAN interface 402, PAN interface 404, secondary radio frequency (RF) link interface 406, or other interface 408. The WLAN interface 402 may be compliant with at least a portion of the Wi-Fi specification. For example, the WLAN interface 402 may be compliant with at least a portion of the IEEE 802.11 specification as promulgated by the Institute of Electrical and Electronics Engineers (IEEE). The PAN interface 404 may be compliant with at least a portion of one or more of the Bluetooth, wireless USB, Z-Wave, ZigBee, or other standards. For example, the PAN interface 404 may be compliant with the Bluetooth Low Energy (BLE) specification.

The secondary RF link interface 406 may comprise a radio transmitter and receiver that operate at frequencies different from or using modulation different from the other interfaces. For example, the WLAN interface 402 may utilize frequencies in the 2.4 GHz and 5 GHz Industrial Scientific and Medicine (ISM) bands, while the PAN interface 404 may utilize the 2.4 GHz ISM bands. The secondary RF link interface 406 may comprise a radio transmitter that operates in the 900 MHz ISM band, within a licensed band at another frequency, and so forth. The secondary RF link interface 406 may be utilized to provide backup communication between the AMD 104 and other devices in the event that communication fails using one or more of the WLAN interface 402 or the PAN interface 404. For example, in the event the AMD 104 travels to an area within the physical space 102 that does not have Wi-Fi coverage, the AMD 104 may use the secondary RF link interface 406 to communicate with another device such as a specialized access point, docking station 106, or other AMD 104.

The other 408 network interfaces may include other equipment to send or receive data using other wavelengths or phenomena. For example, the other 408 network interface may include an ultrasonic transceiver used to send data as ultrasonic sounds, a visible light system that communicates by modulating a visible light source such as a light-emitting diode, and so forth. In another example, the other 408 network interface may comprise a wireless wide area network (WWAN) interface or a wireless cellular data network interface. Continuing the example, the other 408 network interface may be compliant with at least a portion of the 3G, 4G, 5G, LTE, or other standards.

The AMD 104 may include one or more of the following sensors 110. The sensors 110 depicted here are provided by way of illustration and not necessarily as a limitation. It is understood that other sensors 110 may be included or utilized by the AMD 104, while some sensors 110 may be omitted in some configurations.

A motor encoder 410 provides information indicative of the rotation or linear extension of a motor 480. The motor 480 may comprise a rotary motor, or a linear actuator. In some implementations, the motor encoder 410 may comprise a separate assembly such as a photodiode and encoder wheel that is affixed to the motor 480. In other implementations, the motor encoder 410 may comprise circuitry configured to drive the motor 480. For example, the autonomous navigation module 144 may utilize the data from the motor encoder 410 to estimate a distance traveled.

A suspension weight sensor 412 provides information indicative of the weight of the AMD 104 on the suspension system for one or more of the wheels or the caster. For example, the suspension weight sensor 412 may comprise a switch, strain gauge, load cell, photodetector, or other sensing element that is used to determine whether weight is applied to a particular wheel, or whether weight has been removed from the wheel. In some implementations, the suspension weight sensor 412 may provide binary data such as a "1" value indicating that there is a weight applied to the wheel, while a "0" value indicates that there is no weight applied to the wheel. In other implementations, the suspension weight sensor 412 may provide an indication such as so many kilograms of force or newtons of force. The suspension weight sensor 412 may be affixed to one or more of the wheels or the caster. In some situations, the safety module 326 may use data from the suspension weight sensor 412 to determine whether or not to inhibit operation of one or more of the motors 480. For example, if the suspension weight sensor 412 indicates no weight on the suspension, the implication is that the AMD 104 is no longer resting on its wheels, and thus operation of the motors 480 may be inhibited. In another example, if the suspension weight sensor 412 indicates weight that exceeds a threshold value, the implication is that something heavy is resting on the AMD 104 and thus operation of the motors 480 may be inhibited.

One or more bumper switches 414 provide an indication of physical contact between a bumper or other member that is in mechanical contact with the bumper switch 414. The safety module 326 utilizes sensor data 114 obtained by the bumper switches 414 to modify the operation of the AMD 104. For example, if the bumper switch 414 associated with a front of the AMD 104 is triggered, the safety module 326 may drive the AMD 104 backwards.

A floor optical motion sensor (FOMS) 416 provides information indicative of motion of the AMD 104 relative to the floor or other surface underneath the AMD 104. In one implementation, the FOMS 416 may comprise a light source such as light-emitting diode (LED), an array of photodiodes, and so forth. In some implementations, the FOMS 416 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 416 may provide other information, such as data indicative of a pattern present on the floor, composition of the floor, color of the floor, and so forth. For example, the FOMS 416 may utilize an optoelectronic sensor that may detect different colors or shades of gray, and this data may be used to generate floor characterization data. The floor characterization data may be used for navigation.

An ultrasonic sensor 418 utilizes sounds in excess of 20 kHz to determine a distance from the sensor 110 to an object. The ultrasonic sensor 418 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 418 may provide information indicative of a presence of an object, distance to the object, and so forth. Two or more ultrasonic sensors 418 may be utilized in conjunction with one another to determine a location within a two-dimensional plane of the object.

In some implementations, the ultrasonic sensor 418 or a portion thereof may be used to provide other functionality. For example, the emitter of the ultrasonic sensor 418 may be used to transmit data and the detector may be used to receive data transmitted that is ultrasonic sound. In another example, the emitter of an ultrasonic sensor 418 may be set to a particular frequency and used to generate a particular waveform such as a sawtooth pattern to provide a signal that is audible to an animal, such as a dog or a cat.

An optical sensor 420 may provide sensor data 114 indicative of one or more of a presence or absence of an object, a distance to the object, or characteristics of the object. The optical sensor 420 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 420 may utilize one or more sensing elements. For example, the optical sensor 420 may comprise a 4×4 array of light sensing elements. Each individual sensing element may be associated with a field of view (FOV) that is directed in a different way. For example, the optical sensor 420 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 110 such as an image sensor or camera 444. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 420 may operate as a depth camera, providing a two-dimensional image of a scene, as well as data that indicates a distance to each pixel.

Data from the optical sensors 420 may be utilized for collision avoidance. For example, the safety module 326 and the autonomous navigation module 144 may utilize the sensor data 114 indicative of the distance to an object in order to prevent a collision with that object.

Multiple optical sensors 420 may be operated such that their FOV overlap at least partially. To minimize or eliminate interference, the optical sensors 420 may selectively control one or more of the timing, modulation, or frequency of the light emitted. For example, a first optical sensor 420 may emit light modulated at 30 kHz while a second optical sensor 420 emits light modulated at 33 kHz.

A lidar 422 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 114 may be generated that is indicative of the presence of objects and the relative positions, shapes, and so forth that are visible to the lidar 422. Data from the lidar 422 may be used by various modules. For example, the autonomous navigation module 144 may utilize point cloud data generated by the lidar 422 for localization of the AMD 104 within the physical space 102.

The AMD 104 may include a mast. A mast position sensor 424 provides information indicative of a position of the mast of the AMD 104. For example, the mast position sensor 424 may comprise limit switches associated with the mast extension mechanism that indicate whether the mast is at an extended or retracted position. In other implementations, the mast position sensor 424 may comprise an optical code on at least a portion of the mast that is then interrogated by an optical emitter and a photodetector to determine the distance to which the mast is extended. In another implementation, the mast position sensor 424 may comprise an encoder wheel that is attached to a mast motor that is used to raise or lower the mast. The mast position sensor 424 may provide data to the safety module 326. For example, if the AMD 104 is preparing to move, data from the mast position sensor 424 may be checked to determine if the mast is retracted, and if not, the mast may be retracted prior to beginning movement.

A mast strain sensor 426 provides information indicative of a strain on the mast with respect to the remainder of the AMD 104. For example, the mast strain sensor 426 may comprise a strain gauge or load cell that measures a sideload applied to the mast or a weight on the mast or downward pressure on the mast. The safety module 326 may utilize sensor data 114 obtained by the mast strain sensor 426. For example, if the strain applied to the mast exceeds a threshold amount, the safety module 326 may direct an audible and visible alarm to be presented by the AMD 104.

The AMD 104 may include a modular payload bay. A payload weight sensor 428 provides information indicative of the weight associated with the modular payload bay. The payload weight sensor 428 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 428 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 428 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 326 may utilize the payload weight sensor 428 to determine if the modular payload bay has been overloaded. If so, an alert or notification may be issued.

One or more device temperature sensors 430 may be utilized by the AMD 104. The device temperature sensors 430 provide temperature data of one or more components within the AMD 104. For example, a device temperature sensor 430 may indicate a temperature of one or more of the batteries 302, one or more motors 480, and so forth. In the event the temperature exceeds a threshold value, the component associated with that device temperature sensor 430 may be shut down.

One or more interlock sensors 432 may provide data to the safety module 326 or other circuitry that prevents the AMD 104 from operating in an unsafe condition. For example, the interlock sensors 432 may comprise switches that indicate whether an access panel is open. The interlock sensors 432 may be configured to inhibit operation of the AMD 104 until the interlock switch indicates a safe condition is present.

A gyroscope 434 may provide information indicative of rotation of an object affixed thereto. For example, a gyroscope 434 may generate sensor data 114 that is indicative of a change in orientation of the AMD 104 or a portion thereof.

An accelerometer 436 provides information indicative of a direction and magnitude of an imposed acceleration. Data such as rate of change, determination of changes in direction, speed, and so forth may be determined using the accelerometer 436. The accelerometer 436 may comprise mechanical, optical, micro-electromechanical, or other devices. For example, the gyroscope 434 in the accelerometer 436 may comprise a prepackaged solid-state inertial measurement unit (IMU) that provides multiple axis gyroscopes 434 and accelerometers 436.

A magnetometer 438 may be used to determine an orientation by measuring ambient magnetic fields, such as the terrestrial magnetic field. For example, the magnetometer 438 may comprise a Hall effect transistor that provides output compass data indicative of a magnetic heading.

The AMD 104 may include one or more location sensors 440. The location sensors 440 may comprise an optical, radio, or other navigational system such as a global positioning system (GPS) receiver. For indoor operation, the location sensors 440 may comprise indoor position systems, such as using Wi-Fi Positioning Systems (WPS). The location sensors 440 may provide information indicative of a relative location, such as "living room" or an absolute location such as particular coordinates indicative of latitude and longitude, or displacement with respect to a predefined origin.

A photodetector 442 provides sensor data 114 indicative of impinging light. For example, the photodetector 442 may provide data indicative of a color, intensity, duration, and so forth.

A camera 444 generates sensor data 114 indicative of one or more images. The camera 444 may be configured to detect light in one or more wavelengths including, but not limited to, terahertz, infrared, visible, ultraviolet, and so forth. For example, an infrared camera 444 may be sensitive to wavelengths between approximately 700 nanometers and 1 millimeter. The camera 444 may comprise charge coupled devices (CCD), complementary metal oxide semiconductor (CMOS) devices, microbolometers, and so forth. The AMD 104 may use image data 116 acquired by the camera 444 for object recognition, navigation, collision avoidance, user communication, and so forth. For example, a pair of cameras 444 sensitive to infrared light may be mounted on the front of the AMD 104 to provide binocular stereo vision, with the sensor data 114 comprising images being sent to the autonomous navigation module 144. In another example, the camera 444 may comprise a 10 mega pixel or greater camera that is used for videoconferencing or for acquiring pictures for the user.

The camera 444 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 144 may be acquired using a rolling shutter and subsequently may be processed to mitigate image artifacts.

One or more microphones 446 may be configured to acquire information indicative of sound present in the physical space 102. In some implementations, arrays of microphones 446 may be used. These arrays may implement beamforming techniques to provide for directionality of gain. The AMD 104 may use the one or more microphones 446 to acquire information from acoustic tags, accept voice input from users, determine a direction of an utterance, determine ambient noise levels, for voice communication with another user or system, and so forth.

An air pressure sensor 448 may provide information indicative of an ambient atmospheric pressure or changes in ambient atmospheric pressure. For example, the air pressure sensor 448 may provide information indicative of changes in air pressure due to opening and closing of doors, weather events, and so forth.

An air quality sensor 450 may provide information indicative of one or more attributes of the ambient atmosphere. For example, the air quality sensor 450 may include one or more chemical sensing elements to detect the presence of carbon monoxide, carbon dioxide, ozone, and so forth. In another example, the air quality sensor 450 may comprise one or more elements to detect particulate matter in the air, such as the photoelectric detector, ionization chamber, and so forth. In another example, the air quality sensor 450 may include a hygrometer that provides information indicative of relative humidity.

An ambient light sensor 452 may comprise one or more photodetectors 442 or other light-sensitive elements that are used to determine one or more of the color, intensity, or duration of ambient lighting around the AMD 104.

An ambient temperature sensor 454 provides information indicative of the temperature of the ambient physical space 102 proximate to the AMD 104. In some implementations, an infrared temperature sensor may be utilized to determine the temperature of another object at a distance.

A floor analysis sensor 456 may include one or more components that are used to generate at least a portion of floor characterization data. In one implementation, the floor analysis sensor 456 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 456 may be used by one or more of the safety module 326, the autonomous navigation module 144, the task module 342, and so forth. For example, if the floor analysis sensor 456 determines that the floor is wet, the safety module 326 may decrease the speed of the AMD 104 and generate a notification alerting the user.

The floor analysis sensor 456 may include other components as well. For example, a coefficient of friction sensor may comprise a probe that comes into contact with the surface and determines the coefficient of friction between the probe and the floor.

A caster rotation sensor 458 provides data indicative of one or more of a direction of orientation, angular velocity, linear speed of the caster, and so forth. For example, the caster rotation sensor 458 may comprise an optical encoder and corresponding target that is able to determine that the caster transitioned from an angle of 0° at a first time to 49° at a second time.

The sensors 110 may include a radar 460. The radar 460 may be used to provide information as to a distance, lateral position, and so forth, to an object.

The sensors 110 may include a passive infrared (PIR) sensor 462. The PIR sensor 462 may be used to detect the presence of users, pets, hotspots, and so forth. For example, the PIR sensor 462 may be configured to detect infrared radiation with wavelengths between 8 and 14 micrometers.

The AMD 104 may include other sensors 464 as well. For example, a capacitive proximity sensor may be used to provide proximity data to adjacent objects. Other sensors 464 may include radio frequency identification (RFID) readers, near field communication (NFC) systems, coded aperture cameras, and so forth. For example, NFC tags may be placed at various points within the physical space 102 to provide landmarks for the autonomous navigation module 144. One or more touch sensors may be utilized to determine contact with a user or other objects.

Sensors such as the optical sensor 420, lidar 422, radar 460, one or more cameras 444, radar 460, and so forth are may be used to determine occupancy data 372. The occupancy data 372 may comprise information indicative that an area in the physical space 102 contains an obstacle 108 or is determined to be free from obstacles 108.

The AMD 104 may include one or more output devices 316. A motor 480 may be used to provide linear or rotary motion. A light 482 may be used to emit photons. A speaker 384 may be used to emit sound. A display 486 may comprise one or more of a liquid crystal display, light emitting diode display, electrophoretic display, cholesteric liquid crystal display, interferometric display, and so forth. The display 486 may be used to present visible information such as graphics, pictures, text, and so forth. In some implementations, the display 486 may comprise a touchscreen that combines a touch sensor and a display 486.

In some implementations, the AMD 104 may be equipped with a projector 488. The projector 488 may be able to project an image on a surface, such as the floor, wall, ceiling, and so forth.

A scent dispenser 490 may be used to emit one or more smells. For example, the scent dispenser 490 may comprise a plurality of different scented liquids that may be evaporated or vaporized in a controlled fashion to release predetermined amounts of each.

One or more moveable component actuators 492 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 492 to produce movement of the moveable component.

In other implementations, other 494 output devices may be utilized. For example, the AMD 104 may include a haptic output device that provides output that produces particular touch sensations to the user. Continuing the example, a motor 480 with an eccentric weight may be used to create a buzz or vibration to allow the AMD 104 to simulate the purr of a cat.

FIG. 5 illustrates at 500 the physical space 102, trajectories, and associated submaps before and after loop closure, according to some implementations. Also shown are portions of the mapping module 118 including the SLAM module 514.

At 502 the physical space 102 is depicted with an initial trajectory 504. The initial trajectory 504 may be based on initial KP data 518 and a trajectory 124 based on updated KP data 520 after loop closure. As described above, the initial trajectory 504 may vary with respect to the trajectory 124 due to drift in the data, processing, and so forth.

At 506 initial submaps 508 are shown, with each initial submap 508 representing a set of initial submap data 524 as provided by a submap module 522. For example, the initial submaps 508 are depicted as being rectangular with two anchor locations 132 associated with each. The size and shape of the submaps may vary. Note that in some instances the initial submaps 508, following the initial trajectory 504, are misaligned with respect to the trajectory 124.

At 510 aligned submaps 512 are shown, with each aligned submap 512 representing a set of aligned submap data 530. The aligned submaps 512 are now aligned with respect to the trajectory 124.

FIG. 6 illustrates an enlarged view 600 of a submap and the transform that provides an aligned submap 512 after trajectory adjustment, according to some implementations. At 602, based on the initial KP data 518 an initial trajectory 504 (before loop closure) is depicted with an initial submap 508. The initial submap 508 has a first initial anchor pose 604(1) and a second initial anchor pose 604(2) associated with it. The first initial anchor pose 604(1) may be designated as an entry pose while the second initial anchor pose 604(2) may be designated as an exit pose.

At 606, based on the updated KP data 520 provided after the loop closure, the aligned submap 512 has been determined. The aligned submap 512 has a first updated anchor pose 608(1) and a second updated anchor pose 608(2) associated with it. The first updated anchor pose 608(1) may be designated as an entry pose while the second updated anchor pose 608(2) may be designated as an exit pose. Also shown with respect to the aligned submap 512 is the initial submap 508. As a result of the operation of the submap alignment module, the initial submap data 524 was translated and rotated to produce the aligned submap data.

Figure 7:
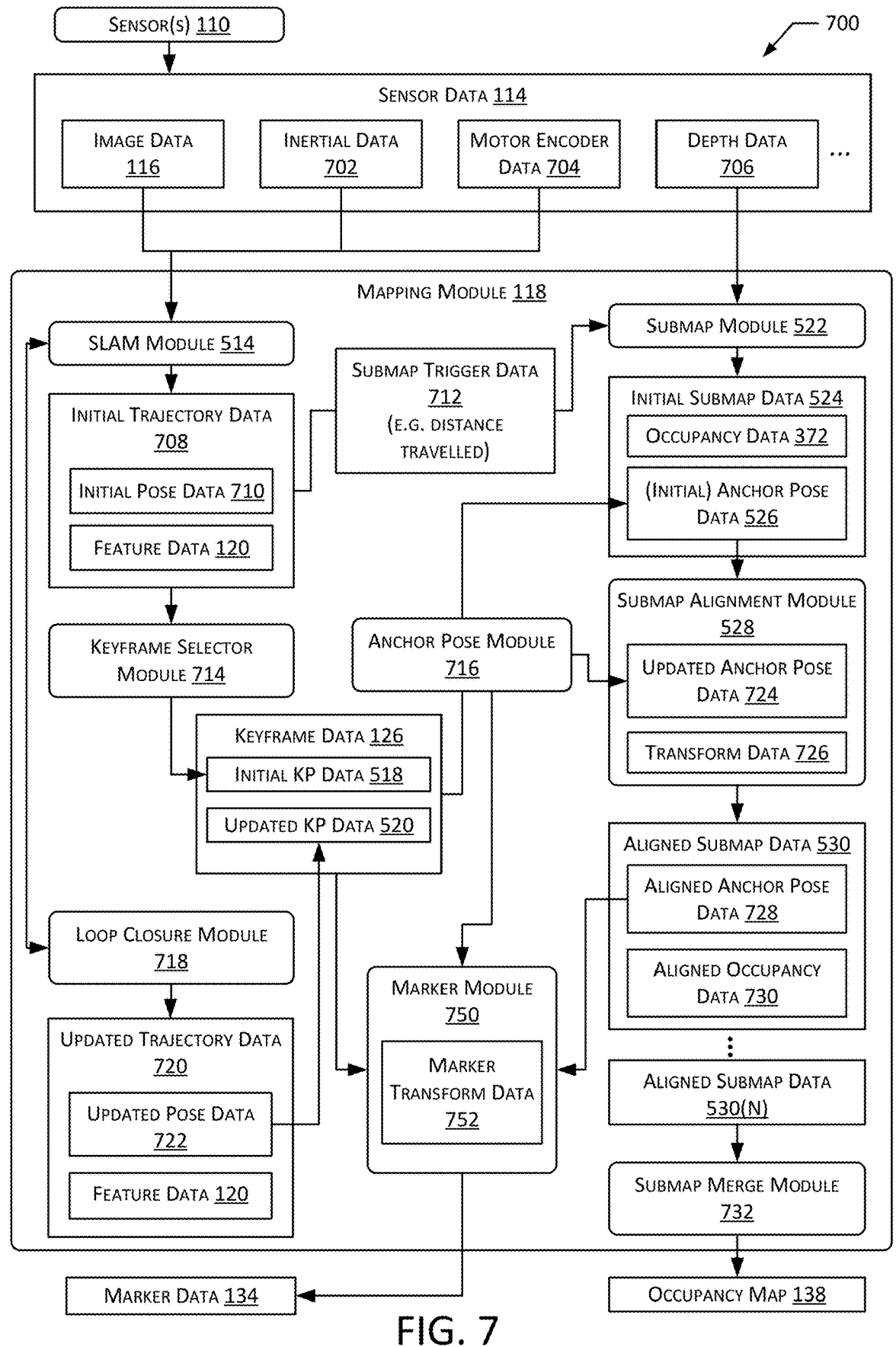
FIG. 7 illustrates a block diagram of a mapping module that utilizes anchor poses associated with submaps to generate the occupancy map, according to some implementations.

FIG. 7 illustrates a block diagram 700 of a mapping module 118 that utilizes anchor poses associated with submaps to generate the occupancy map 138, according to some implementations.

The sensors 110 on the AMD 104 provide sensor data 114. The sensor data 114 may include image data 116 acquired from one or more cameras 444. For example, a pair of red-green-blue (RGB) color cameras may be arranged on a common rigid structure to provide a stereocamera pair. The image data 116 may comprise the images produced by these cameras 444. The IMU comprising one or more gyroscopes 434 and accelerometers 436 may provide inertial data 702. For example, the IMU may be mounted to the chassis of the AMD 104, and provide inertial data 702 indicative of rotations and accelerations of the AMD 104 during movement. Motor encoder data 704 may be provided by a motor encoder 410. For example, a motor encoder 410 on the motor 480 used to rotate one of the drive wheels of the AMD 104 may provide motor encoder data 704 indicating a number and direction of rotations of the motor 480 shaft. Depth sensors such as ultrasonic sensors 418, optical sensors 420 such as a TOF depth camera, LIDAR 422, radar 460, and so forth may provide depth data 706 that is indicative of the presence or absence of obstacles in the physical space 102 within the FOV 112 of the depth sensor. For example, a sensor such as a TOF depth camera may emit a pulse of infrared light and use a detected return time for reflected light to determine a distance between the sensor and the object that reflected the light. The depth data 706 may be expressed as point cloud data, volumetric data, bearing and distance data, and so forth.

As described above, the mapping module 118 includes a SLAM module. The SLAM module 514 may accept as input the image data 116 and may also use other data such as the inertial data 702, the motor encoder data 704, and so forth. The SLAM module 514 may process the input to determine initial trajectory data 708 that is indicative of the initial trajectory 504 before loop closure. The initial trajectory data 708 may comprise initial pose data 710 indicative of initial poses. The initial poses may comprise data indicative of a location and rotations with respect to one or more axes based on the input. For example, the initial poses may be expressed as a 6D set of values. In some implementations the pose data may include a confidence value. If the confidence value is below a threshold value, the pose data may be discarded from consideration. For example, the initial pose data 710 may comprise pose data provided by the SLAM module 514 that has associated confidence values greater than the threshold value.

Each initial pose may be associated with feature data 120. For example, the feature data 120 may comprise information about the features 122 determined to be present in the image data 116 associated with that pose. For example, the image data 116 associated with the pose may be processed to determine one or more features 122, and those features 122 may be characterized to determine descriptors that are then stored as the feature data 120.

Information from the initial trajectory data 708 or other information such as motor encoder data 704 may be used to determine submap trigger data 712. Submap trigger data 712 may be determined responsive to the occurrence of a trigger. The trigger may comprise distance travelled, accumulated rotation with respect to one or more axes since a previous trigger, elapsed time, change in successive feature data 120 that exceeds a threshold value, and so forth. For example, a determination may be made as to whether the AMD 104 has moved at least a threshold distance from a first location to a second location, such as 3 meters of travel as indicated by the initial trajectory data 708, resulting in submap trigger data 712 being generated. In another example, if a similarity between two successive sets of feature data 120 is below a threshold value, submap trigger data 712 may be determined. The submap trigger data 712 is provided to the submap module 522. Responsive to the submap trigger data 712, the submap module 522 may determine a new set of initial submap data 524.

A keyframe selector module 714 processes the initial trajectory data 708 and selects keyframes for later use. The concept of a "keyframe" may be used to reduce the amount of data processing and storage by the system. For example, the system could operate by storing every initial pose and associated feature data 120, but this would require a large amount of storage and would also increase the processing requirements for processes such as loop closure. Keyframe selection allows the system to select initial pose data 710 and corresponding feature data 120 for retention and later use. Keyframes may be designated based on distance, time, changing feature data 120 in the image data 116, and so forth. For example, a keyframe may be designated at specified intervals of time, such as every 3 seconds. In another example, a keyframe may be designated every 50 cm of movement. In yet another example, every $n^{th}$ pairs of stereo images in the image data 116 may be designated a keyframe. In still another example, a keyframe may be designated every time the AMD 104 is powered on or immediately before being powered off. In some implementations, the submap module 522 may send a request to the keyframe selector module 714. Responsive to the request, the keyframe selector module 714 may designate the next pair of stereo images as a keyframe.

The keyframe selector module 714 provides as output the keyframe data 126 which initially includes the initial KP data 518. As described above, the initial KP data 518 comprises information about the initial poses from the initial pose data 710 that have been designated as keyframe poses and the feature data 120 associated with those keyframe poses.

The initial KP data 518 is provided to an anchor pose module 716. The anchor pose module 716 generates initial anchor pose data 526 based on the initial KP data 518. The initial anchor pose data 526 is included in the initial submap data 524 and is associated with occupancy data 372 for that initial submap 508. The first anchor pose created proximate to the point where the initial trajectory 504 enters the initial submap 508 may be designated an "entry anchor pose" while the second anchor pose created proximate to the point where the initial trajectory 504 exits the initial submap 508 may be designated as an "exit anchor pose". An exit anchor pose for a first submap is also an entry anchor pose for a successive second submap. While two anchor poses are described in this disclosure with respect to each submap, additional anchor poses may be used.

In another implementation, the SLAM module 514 may select a different set of keyframes as compared to the submap module 522. For example, the submap module 522 may select submap keyframes based on distance travelled while the SLAM module 514 may select SLAM keyframes based on elapsed time. In this implementation, a submap keyframe may be associated with a corresponding SLAM keyframe using a keyframe transformation matrix. The keyframe transformation matrix may comprise a transform matrix that describes a rigid transform between the submap keyframe and an associated SLAM keyframe. In some implementations the submap keyframe may be associated with data acquired at a first time while the SLAM keyframe may be associated with data acquired at a second time. For example, the submap module 522 may determine that a submap is to be created and the keyframe selector module 714 may determine a submap keyframe, which is then associated with the SLAM keyframe which is closest in time to the submap keyframe via the keyframe transformation matrix.

In some implementations the submap module 522 may use information from the SLAM module 514 to conclude a current submap and establish a new submap, or discard a submap. For example, if the confidence value of the pose data in the initial KP data 518 is less than a threshold value, an existing submap may be concluded and another submap created. In another implementation a difference between the location as determined by the SLAM module 514 and other sensor data 114, such as from the inertial data 702 or the motor encoder data 704 exceeds a threshold distance, the submap module 522 may conclude a current submap, discard a current submap, establish a new submap, or take other action. For example, if the user picks up and moves the AMD 104 from one room to another, the initial pose data 710 indicates a first location based on SLAM while the motor encoder data 704 may indicate no movement has taken place. As a result of this discrepancy, the current submap may be closed, and a new submap determined.

The initial submap data 524 now comprises occupancy data 372 that provides information about the obstacles 108 which were in the FOV 112 of the depth sensors and detected by those depth sensors. The relative locations of those obstacles 108 are now associated with the initial anchor pose data 526, providing a connection to the initial trajectory 504 and the other data provided by the SLAM module 514 and associated systems.

As the system 100 continues to operate, the loop closure module 718 determines that the AMD 104 has returned to about the same location as it previously had been. For example, the loop closure module 718 may be comparing recently acquired feature data 120 with previously stored initial KP data 518. This comparison may include determining if more than a threshold number or count of features 122 having the same or similar descriptors have been detected. Once the determination is made that the AMD 104 has returned to about the same location, the loop closure module 718 may perform the loop closure process. This loop closure process may include bundle adjustment or other functions that adjust previously stored trajectory data such as poses and determines updated trajectory data 720.

The updated trajectory data 720 may include updated pose data 722 that is based on the initial pose data 710. The feature data 120 associated with the updated pose data 722 may be retained. For example, a first initial pose may have a first location indicated with respect to the various features 122 observed in the image data 116. After the loop closure, the updated initial pose may indicate a second location that is in a slightly different location with respect to the same various features 122. The loop closure module 718 attempts to resolve the drift that is present in the initial trajectory 504 by assuming that at least a minimum number of the same set of features 122 are observed, the AMD 104 must be back in the same location, and given that most of the features 122 have not moved, any discrepancy in the location is due to other error.

The updated trajectory data 720 describes the trajectory 124. From this updated trajectory data 720, updated KP data 520 is determined. For example, information about the keyframes that were designated by the keyframe selector module 714 is now used to associate the updated pose data 722 with a particular keyframe and provide the updated KP data 520. The updated KP data 520 may be provided to the anchor pose module 716 or directly to the submap alignment module 528 and used as updated anchor pose data 724. The updated anchor pose data 724 comprises information indicative of the updated pose of the anchors associated with the initial submap data 524.

At this point the mapping module 118 has the initial submap data 524 with the occupancy data 372 and the initial anchor pose data 526 for the at least two initial anchor poses of that initial submap 508. Following the loop closure or other process that may provide updated trajectory data 720, the updated KP data 520 is used to provide the updated anchor pose data 724 for the at least two updated anchor poses of the initial submap 508.

The submap alignment module 528 uses the initial anchor pose data 526 and the updated anchor pose data 724 to determine transform data 726 which is then used to determine the aligned submap data 530. The aligned submap data 530 may comprise aligned anchor pose data 728 and aligned occupancy data 730. For example, the submap alignment module 528 may use a least-squares transform algorithm to determine one or more of a translation or rotation that associates the pair of initial anchor poses with the pair of updated anchor poses. For the purposes of the submap alignment module 528, the transform may be assumed to be rigid, in that the relative position between elements in the initial submap data 524 remains the same in the aligned submap data 530. This may be visualized as the entire initial submap 508 being one or more of rotated or translated as a whole, with respect to the rest of the world, into the aligned submap 512. In other implementations other transforms may be applied, such to adjust for perspective, skew, warping, and so forth. In some implementations the transform data 726 may comprise a transform matrix that is applied to the occupancy data 372 in the initial submap data 524 to determine aligned occupancy data 730. The aligned submap data 530 is now aligned with respect to the trajectory 124.

In some implementations the submap alignment module 528 may limit determination of the transform data 726 to situations in which the distance between an initial anchor pose and a corresponding updated anchor pose exceeds a threshold. For example, the submap alignment module 528 may determine a first distance between a first location of a first initial anchor pose 504(1) and an associated first updated anchor pose 508(1). If the first distance exceeds a threshold distance, the submap alignment module 528 may determine the transform data 726 and produce the aligned submap data 530. In some implementations this determination of the distance may be done to reduce the computational requirements of the process 100. For example, if there is not much drift such as in the case of frequent loop closures due to relatively short initial trajectories 504 in a stable and feature-rich physical space 102, then the alignment process may not be needed.

The process may be repeated to provide aligned submap data 530 providing aligned submaps 512 for the initial submap data 524 indicative of the initial submaps 508 that were determined. The aligned submaps 512 are now aligned to a common coordinate system that is self-consistent. A submap merge module 732 uses the aligned submap data 530 to determine the occupancy map 138. For example, the occupancy data 372 and the resulting aligned occupancy data 730 may comprise occupancy values expressed as log odds values. The submap merge module 732 may sum the log odds values for the cells 148 within the aligned submaps 512 that represent the same physical area in the physical space 102 to determine the occupancy value for that cell 148 in the occupancy map 138.

A marker module 750 determines the marker data 134 indicative of one or more markers. The marker module 750 may use one or more of the keyframe data 126, data from the anchor pose module 716, or the aligned anchor pose data 728 to determine the marker data 134. For example, responsive to a request to determine a marker associated with a marker location 136, the marker module 750 may determine the anchor data 130 associated with the closest anchor location 132 that is closest and has an unobstructed line of sight to the current location at the time of the request. The marker data 134 may be determined that includes, or references, the feature data 120 associated with the anchor location 132.

In one implementation the marker location 136 and corresponding marker data 134 may use the closest anchor location 132, keyframe location 128, or other datum location. For example, the marker location 136 may be the same as the anchor location 132 or the keyframe location 128.

In another implementation, the marker location 136 may be specified with respect to the datum location. In this implementation, marker transform data 752 may specify a rigid transform that associates the marker location 136 to the datum location. For example, the marker transform data 752 may comprise a rigid transform matrix that describes a rigid transform between the marker location 136 and the datum location.

FIG. 8 illustrates at 800 the AMD 104 during an exploration to build the occupancy map 138, according to some implementations. The AMD 104 is shown at a current location 802 with sensors 110 and their respective sensor FOV 112 extending away from that current location 802.

Sensors 110 may exhibit a sensor blind spot 804. The sensor blind spot 804 may comprise one or more of an area or volume within which the sensor 110 does not provide usable data. The sensor blind spot 804 may result from one or more of the operation of the sensor 110, the location of the sensor 110, or other considerations. For example, the sensor 110 may be mounted on the AMD 104 in such a way that a portion of the AMD 104 obscures a part of the physical space 102 in front of the AMD 104, producing a sensor blind spot 804. In another example, the sensor 110 may have a minimum distance for operation, and is not able to provide sensor data 114 for an object that is less than that minimum distance away for the sensor 110. In other implementations there may not be a sensor blind spot 804, and the minimum distance may be zero.

A portion of the physical space 102 that is within the sensor FOV 112 and not in the sensor blind spot 804 may be observed by the sensors 110. Sensor data 114 provided by the sensors 110 about the portion of the physical space 102 in the sensor FOV 112 may be used to determine information about the placement of the obstacles 108. The AMD 104 may explore the physical space 102 by changing the direction of the sensor FOV 112 and changing the location of the AMD 104 in the physical space 102, as described below with regard to the exploration module 140.

In this illustration, an occupancy map 138 associated with the physical space 102 is shown that comprises a plurality of cells 148. Cells 148 that are shaded black are those having an occupancy value above a threshold value that is indicative of being occupied by an obstacle 108. Cells 148 that are not shaded are deemed to be unoccupied and thus travers- able by the AMD 104. The cells representing the physical space outside of the sensor FOV 112 are grayed out, to indicate that they have not yet been observed. Additional details about the occupancy map 138 are discussed with regard to FIGS. 9-11.

The exploration module 140 directs the AMD 104 to explore the physical space 102 in order to gather sensor data 114 and subsequently create or update the occupancy map 138. Exploration may take place in different situations. For example, when the AMD 104 is first introduced into the physical space 102, exploration is necessary to generate the occupancy map 138 for the first time. Likewise, the physical space 102 may change over time, so the AMD 104 may periodically explore at least part of the physical space 102 to update an existing occupancy map 138. The exploration module 140 uses the techniques described herein to quickly and efficiently explore the physical space 102 while minimizing or eliminating duplicative attempts to re-explore a part of the physical space 102 that is not observable.

The cells 148 in the occupancy map 138 may be designated as being unoccupied observed cells 806, occupied observed cells 808, and unobserved cells 810. As described above, the occupancy value of a cell 148 is indicative of the physical space 102 associated with the cell 148. In other implementations other designations may be used instead of, or in addition to these. An unoccupied observed cell 806 is a cell 148 that represents the physical space 102 within the sensor FOV 112 and sensor data 114 was obtained that was then processed to determine that the cell 148 is unoccupied as it does not contain an obstacle 108. An occupied observed cell 808 is a cell 148 indicative of the physical space 102 within the sensor FOV 112 and sensor data 114 was obtained that was then processed to determine that the cell 148 is occupied as it does contain an obstacle 108. An unobserved cell 810 is a cell 148 that represents the physical space 102 that has either not yet been within the sensor FOV 112, is obscured by another obstacle 108, for which inadequate sensor data 114 was obtained to determine whether the cell 148 was occupied or not, and so forth.

The observed cells comprise the set of cells 148 that include the unoccupied observed cells 806 and the occupied observed cells 808. In the occupancy map 138 in FIG. 8, these cells are depicted as white. The unobserved cells 810 are shaded with an overlay. The sensor FOV 112 is shown as an unshaded arcuate area in the occupancy map 138, with the observed cells within. In some implementations, the physical space 102 may consist of the observed cells and the unobserved cells 810.

A frontier is a region of the physical space 102 that is associated with the boundary between the observed cells and the unobserved cells 810. In one implementation, a frontier cell 812 is an unobserved cell 810 that is immediately adjacent to an observed cell. For example, the frontier cell 812 may be the cell representing the physical space 102 that is just outside the sensor FOV 112 and unobserved. The frontier cell 812 may also adjoin at least one cell in a 4-connected neighborhood that has been observed and is unoccupied, and is not within a threshold distance of a block listed OT cell 814. In another implementation, the frontier cell 812 may be an observed and unoccupied cell that is immediately adjacent to an unobserved cell 810. A frontier region may comprise a plurality of frontier cells 812 that are adjacent to one another, such as sharing either a side of a cell 148 or at least one corner.

The exploration module 140 determines where to move the AMD 104 and which direction to point the sensor FOV 112 to explore the physical space 102 and produce an occupancy map 138 in which, in the ideal circumstance, the unobserved cells 810 are at a minimum or zero.

The exploration module 140 may use one or more parameters to determine frontier cell data 350. For example, the frontier cell data 350 is indicative of one or more frontier cells 812 that comply with one or more specified parameters. Determination of the frontier cell data 350 is discussed in more detail with regard to FIG. 9.

The frontier cell data 350 is then used to determine observation target (OT) cell data 352 that is indicative of an OT cell 814. The OT cell 814 is a cell 148 that is on or near the frontier. For example, the OT cell 814 may comprise an unobserved cell 810 from the frontier cell data 350. Based on the OT cell data 352 and one or more goal pose parameters, goal pose data 354 is determined. The goal pose data 354 is indicative of a goal pose 816 comprising a goal cell indicative of a particular cell 148 or location and an orientation. A marker is then determined that is associated with the goal pose 816. For example, the marker location 136 that is closest to the goal cell in a current version of the occupancy map 138 may be retrieved from the marker data 134. The orientation of the AMD 104 at the goal cell is determined to direct the sensor FOV 112 from the goal cell to, and past, the physical space 102 associated with the OT cell 814.

If the exploration module 140 is unable to determine goal pose data 354 for the OT cell 814 that meets the goal pose parameters, the marker associated with the OT cell 814 may be added to block list data 142. For example, the marker data 134 associated with the marker assigned with the OT cell 814 may be stored in OT block list data.

During operation, the exploration module 140 determines the OT cell data 352 and the goal pose data 354 with associated marker(s). The autonomous navigation module 144 is used to try and move the AMD 104 to the marker location 136 associated with the goal pose 816. If the AMD 104 is unable to position itself at the physical space 102 and orientation associated with the marker location 136 of the goal pose 816, or the physical space 102 associated with the OT cell 814 is unobservable from the goal pose 816, then one or more of the OT cell 814 or the goal pose 816 may be added to the block list data 142. For example, the OT cell 814 may be stored in OT block list data, the cell 148 associated with the goal pose 816 may be stored in goal block list data, and so forth.

During subsequent operation, the exploration module 140 will avoid the use of one or more of cells 148 or poses that are associated with markers in the block list data 142. For example, markers listed in the OT block list data that are associated with OT cells 814 may be excluded from use as observation targets, markers for locations of goal pose cells listed in goal block list data may be excluded from use as goal poses 816, and so forth. By avoiding the markers in the block list data 142, the exploration module 140 reduces or eliminates duplicative and unproductive movements and acquisition of sensor data 114. Operation of the exploration module 140 is discussed in more detail below with regard to FIG. 9.

FIG. 9 illustrates data 900 associated with the system 100, according to some implementations. The occupancy map 138 or navigation map 348 based on the occupancy map 138 comprises cells 148 in a specified arrangement. For example, the specified arrangement may comprise a grid or two-dimensional array of cells 148 arranged in rows and columns. Each cell 148 may be represented by a cell identifier 902 indicative of that cell 148 within the grid or within a specific row or column. Each cell 148 is associated with a particular area in the physical space 102. For example, each cell 148 may represent an area in the physical space 102 that is 5 cm by 5 cm. A location of that area 904 may be expressed in various ways, such as a set of cell coordinates relative to an origin. Each cell 148 may be associated with an observation status 906 that indicates if that cell 148 is unobserved or observed. Each cell 148 may also be associated with an occupancy value 908 that indicates whether the particular location 904 of that cell 148 is occupied or unoccupied. For example, an occupancy value of −1 may indicate an unoccupied cell with no obstacle 108, a 0 value indicates the cell has been unobserved, and +1 indicates the cell is occupied by an obstacle 108. The navigation map 348 may be similar to the occupancy map 138. In some implementations the occupancy map 138 or navigation map 348 may include a marker that is associated with a cell 148.

The block list data 142 may comprise information about markers that have been determined by the exploration module 140 to be block listed. In one implementation, such as indicated here, the block list data 142 may comprise two separate data structures.

Observation target (OT) block list data 910 stores information about markers associated with OT cells 814 that have been block listed. The OT block list data 910 may comprise a block list identifier 912 that is representative of a particular entry in the block list data 142. Each entry may include the cell identifier 902 and associated information such as the location 904, other information such as marker identifier 236, count of occurrences 914, and so forth. The count of occurrences 914 may indicate the number of times that a particular entry has been associated with an exploration failure. For example, the count of occurrences 914 may indicate the number of times observation of a particular marker that is associated with an observation target has been attempted but failed. In some implementations an entry in the block list data 142 may not be considered by the exploration module 140 until a threshold value has been reached. For example, a marker associated with an OT cell 814 may not be omitted from use until the count of occurrences 914 exceeds a threshold value.

Goal block list data 916 stores information about markers associated with goal poses 816 that have been block listed. The goal block list data 916 may comprise a block list identifier 912 that is representative of a particular entry in the block list data 142. Each entry may include the cell identifier 902 and associated information such as the location 904, marker identifier 236, and other information such as count of occurrences 914, paired with 918 data, and so forth. The cell identifier 902 may be specified with respect to a particular version or iteration of the occupancy map 138. For example, the cell identifier 902 may be associated with a latest version of the occupancy map 138. The paired with 918 data indicates if the block listed entry is paired with another entry in the block list data 142. In some implementations, a particular combination of a first marker associated with an OT cell 814 and a second marker associated with a goal pose 816 may be block listed. For example, the entry in the goal block list data 916 for the marker identifier 236(1) for a goal pose having block list identifier "4" may be paired with a block list identifier 912 that indicates the marker identifier 236(2) for an OT cell 814 with the block list identifier "2". As described above, the count of occurrences 914 may indicate the number of times that a marker location 136 associated with a particular entry has been associated with an exploration failure.

In some implementations a single block list data structure may be maintained. For example, observation target block list data 910 and goal block list data 916 may be stored in a common data structure. In this implementation, data indicative of a marker type may indicate if the block list marker is associated with an observation target, a goal cell, or for another reason.

Other data may be associated with entries in the block list data 142. For example, a date when the entry is effective, expiration date, or other information may be stored.

Figure 10:
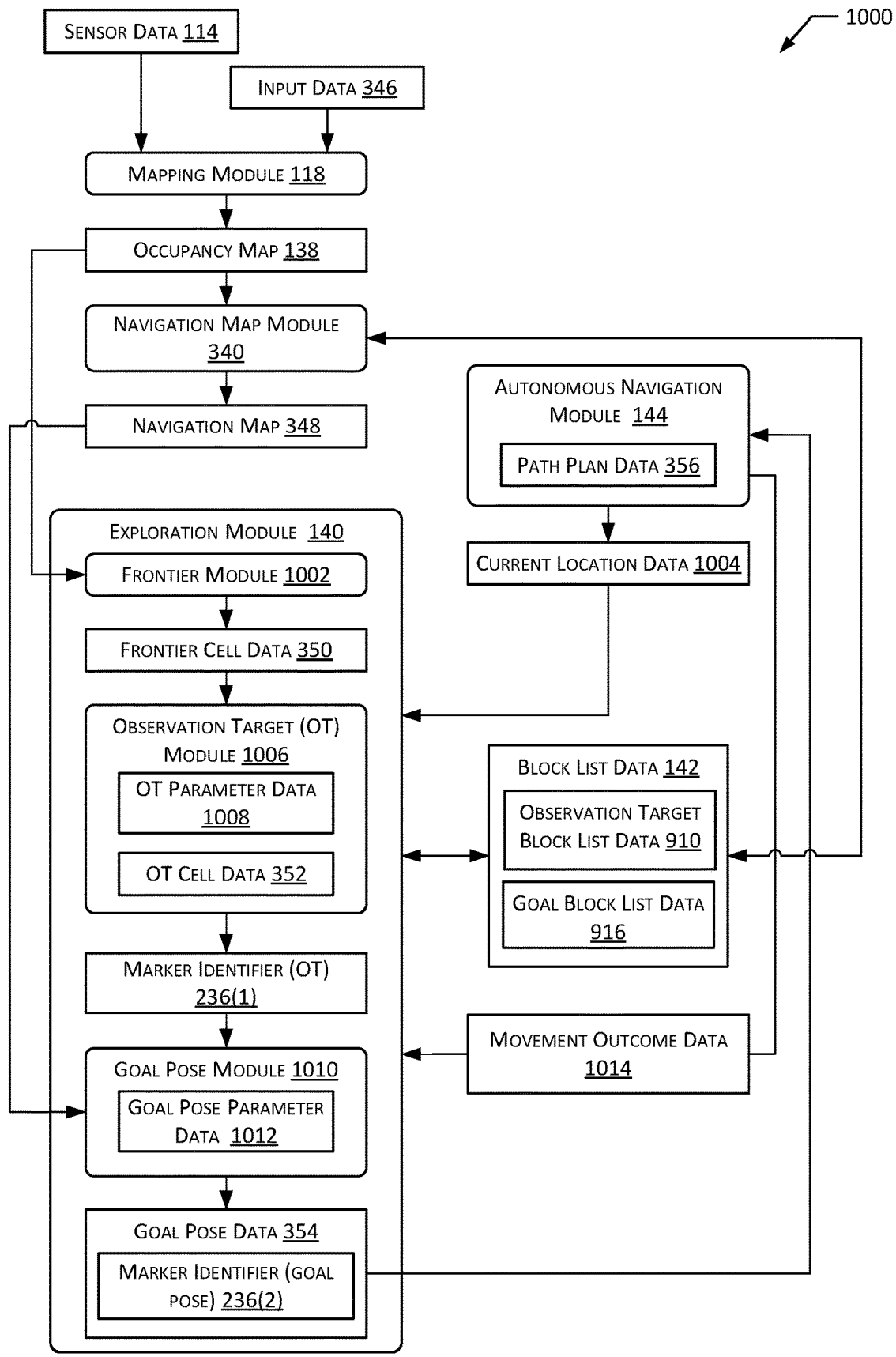
FIG. 10 illustrates an exploration module that is used to direct the AMD through the physical space to facilitate exploration, according to some implementations.

FIG. 10 illustrates at 1000 an exploration module 140 that is used to direct the AMD 104 through the physical space 102 to facilitate exploration, according to some implementations.

One or more of the sensor data 114 or the input data 346 are provided to the mapping module 118 which determines the occupancy map 138. As mentioned above, initially the occupancy map 138 may have information limited to a small set of observed cells indicative of the physical space 102 within the sensor FOV 112.

The navigation map module 340 determines the navigation map 348. For example, obstacles 108 indicated in the occupancy map 138 by occupied observed cells 808 and unobserved cells 810 may be inflated to produce the navigation map 348. In some implementations one or more cells 148 indicated by the block list data 142 may be considered by the navigation map module 340 and inflated.

The exploration module 140 may accept the occupancy map 138 or the navigation map 348 as input. A frontier module 1002 determines frontier cell data 350 indicative of one or more frontier cells 812. In the implementation shown here, the occupancy map 138 is used by the frontier module 1002 to determine the frontier cell data 350. For example, the frontier module 1002 may determine a set of cells 148 that are at a boundary between observed cells and unobserved cells 810 as indicated in the occupancy map 138. The frontier module 1002 may access the block list data 142 and use this information to provide frontier cell data 350 that omits cells associated with block list markers. For example, the frontier cell data 350 may comprise cells 148 on the frontier that are not associated with block listed markers. In some implementations the frontier module 1002 may exclude from the frontier cell data 350 those cells 148 that are within a specified distance of block listed markers indicated in the block list data 142.

The frontier module 1002 may provide frontier cell data 350 for a plurality of frontiers. For example, the frontier cell data 350 may be indicative of a frontier cell 812 for each of the frontiers that are determined to be present in the physical space 102.

The autonomous navigation module 144 may provide current location data 1004 to the exploration module 140. The current location data 1004 may include information indicative of the current location 802 including orientation of the AMD 104.

An observation target (OT) module 1006 accepts the frontier cell data 350 as input and uses OT parameter data 1008 to determine the OT cell data 352. The OT parameter data 1008 may specify one or more of a minimum distance from the frontier, a maximum distance from the frontier, a selection algorithm, and so forth. The OT module 1006 may disregard from consideration cells that are within a threshold distance of, or are associated with, block listed markers indicated in the OT block list data 910.

The OT cell data 352 associates a particular cell 148 with a marker that indicates a marker location 136 as described by marker data 134. The marker location 136 specifies a particular location in the physical space 102 with respect to the features 122 in the physical space 102.

In one implementation, the selection algorithm may use a geometric distance to select the cell 148 in the frontier cell data 350 that is located at a least or shortest distance to the current location 802. For example, a first distance is determined between the current location 802 of the AMD 104 and a first cell 148 associated with an area in the physical space 102 indicated in the frontier cell data 350. Once the cell 148 in the frontier cell data 350 has been selected, the marker location 136 and associated marker data 134 may be determined. For example, the marker may be selected that has a marker location 136 that is closest to the current location 802 and an unobstructed line of sight with no obstacles 108.

A second distance is determined between the current location 802 of the AMD 104 and a second cell 148 associated with an area in the physical space 102 indicated in the frontier cell data 350. If the first distance is less than the second distance, then the first cell 148 is selected as the OT cell 814. Once the OT cell 814 has been selected, the marker location 136 and marker data 134 associated with the selected OT cell 814 may be determined.

At any given time, a plurality of frontiers may be present. For example, frontiers may be present at a leading edge, left edge, and right edge of the sensor FOV 112. The frontier cell data 350 may be indicative of cells 148 along one or more of these frontiers.

A goal pose module 1010 accepts as input the OT cell data 352 that is indicative of the OT cell 814 and uses goal pose parameter data 1012 to determine the goal pose data 354. The goal pose data 354 comprises data indicative of a goal location and a goal orientation. The goal pose module 1010 may use a wavefront algorithm to search the navigation map 348 for cells 148 nearest the OT cell 814 that meet the conditions specified in the goal pose parameter data 1012. The navigation map 348 may be used to avoid situations in which the goal pose 816 might result in travel alongside an unobserved cell 810 which contains an obstacle 108. In such a situation, if the AMD 104 were to rotate while moving it could collide with the previously unobserved obstacle 108. In other implementations the goal pose module 1010 may search the occupancy map 138.

The goal pose parameter data 1012 may specify various conditions for a cell 148 to satisfy in order to be considered a goal cell. The goal pose parameter data 1012 may specify that the goal cell is one or more of: designated as unoccupied, is not associated with a marker indicated in the goal block list data 916, is not an excluded cell, is within a first threshold range of the OT cell 814 (wherein the first threshold range is indicative of a minimum distance and a maximum distance), is closest to the OT cell 814, is in a direct line of sight (LOS) to the OT cell 814 (the line of sight does not pass through an occupied observed cell 808), or is at least a minimum distance threshold from the current location 802. For example, the goal pose module 1010 determines a marker associated with a goal cell such that the OT cell 814 is associated with the physical space 102 within the sensor FOV 112. For example, the goal pose parameter data 1012 may specify that a first distance between the OT cell 814 and the goal cell is greater than a minimum sensor distance and less than a maximum sensor distance of the one or more sensors 110. A goal orientation places the second cell within a sensor field of view 112 of the one or more sensors 110, as described next.

In another implementation, the selection algorithm may use information about path cost to select the goal cell that has the lowest path cost. The autonomous navigation module 144 may be used to determine the path cost. For example, a first path cost is determined that is indicative of a cost associated with movement of the AMD 104 from the current location 802 to a marker associated with a first goal cell associated with an area in the physical space 102. A second path cost is determined that is indicative of a cost associated with movement of the AMD 104 from the current location 802 to a second goal cell associated with an area in the physical space 102. If the first path cost is less than the second path cost, then the first goal cell is selected as the goal cell for the goal pose 816. In one implementation, the Theta* path planning algorithm may be used to determine path cost. (See "Theta*: Any-Angle Path Planning on Grids", Alex Nash, Kenny Daniel, Sven Koenig, Ariel Felner.) In another implementation the A* path planning algorithm may be used. (See "A Formal Basis for the Heuristic Determination of Minimum Cost Paths", Peter E. Hart, Nils J. Nilsson, Bertram Raphael.) In other implementations other selection algorithms or combinations of selection algorithms may be used. The path cost may take into consideration angular and linear complexity. For example, a first path with more turns may have a higher path cost than a second path with fewer turns.

The goal pose module 1010 may determine the goal orientation ("orientation") for the goal cell that orients the sensor FOV 112 of the one or more of the sensors 110 towards the physical space 102 associated with the first OT cell 814. The goal pose parameter data 1012 may also specify one or more of a maximum permissible off-center deviation between the sensor FOV 112 and the LOS to the OT cell 814. For example, the goal pose data 354 may be limited to provide an orientation that places the center of the sensor FOV 112 within 5 degrees of a straight line from the goal cell to the OT cell 814.

The goal pose module 1010 may determine the goal orientation using an Eigenvector of points along the frontier. For example, the frontier cells 812 may describe a contour along the frontier, and Eigenvectors may be calculated and used to determine a vector that is generally perpendicular to the contour. The goal orientation may be determined using this vector.

In some implementations the goal pose module 1010 may use goal pose parameter data 1012 that specifies that a distance from the current location 802 to the goal cell is at least a first distance. For example, this parameter may prevent the exploration from being conducted in a larger number of shorter moves.

If the goal pose module 1010 determines that no goal pose 816 is possible which satisfies the goal pose parameter data 1012, the marker associated with the OT cell 814 that is indicated in the OT cell data 352 may be added to the goal block list data 916 in the block list data 142.

If the goal pose module 1010 determines a goal pose 816 that satisfies the goal pose parameter data 1012, the marker associated with the goal pose data 354 may be provided to the autonomous navigation module 144. The autonomous navigation module 144 may then use the marker data 134 for the marker associated with the goal pose data 354 to determine path plan data 356. The path plan data 356 may be indicative of a path from the current location 802 to the marker location 136 associated with the goal cell indicated by the goal pose data 354. The autonomous navigation module 144 may generate the path plan data 356 such that the AMD 104 is oriented in the goal orientation as specified by the goal pose data 354 upon arrival at the marker location 136 associated with the goal cell.

In some implementations, a plurality of OT cells 814 may be indicated for different frontiers. A goal pose 816 and associated marker for each of these OT cells 814 may be determined. The marker location 136 associated with the goal pose 816 to which the AMD 104 is to be moved may be determined based on a path cost. For example, a path cost algorithm such as A* or Theta* may be used to determine a path cost for each of the available goal poses 816. The goal pose 816 with the lowest path cost may be selected.

The autonomous navigation module 144 may then move the AMD 104 along at least a portion of the path as indicated by the path plan data 356 of the selected goal pose 816. The autonomous navigation module 144 may generate movement outcome data 1014 that is indicative of whether the move to the marker location 136 associated with the goal pose 816 was successful. The movement outcome data 1014 may be provided to the exploration module 140. If the move to the marker location 136 associated with the goal pose 816 fails, the exploration module 140 may add the marker(s) associated with one or more of the OT cell 814, the goal cell, the goal orientation, or the goal pose 816 to the block list data 142. For example, the OT cell 814 may be added to the OT block list data 910, the goal cell may be added to the goal block list data 916, and so forth.

If the movement outcome data 1014 indicates that the AMD 104 has reached the marker location 136 associated with the goal pose 816, but the OT cell 814 remains unobserved, then the marker associated with the OT cell 814 may be added to the block list data 142.

If the movement outcome data 1014 indicates that the AMD 104 has reached the marker location 136 associated with the goal pose 816, and the OT cell 814 is observed, the exploration module 140 may continue to explore. In some implementations, a cell associated with a previously block listed marker that is later observed may be removed from the block list data 142.

Figure 11:
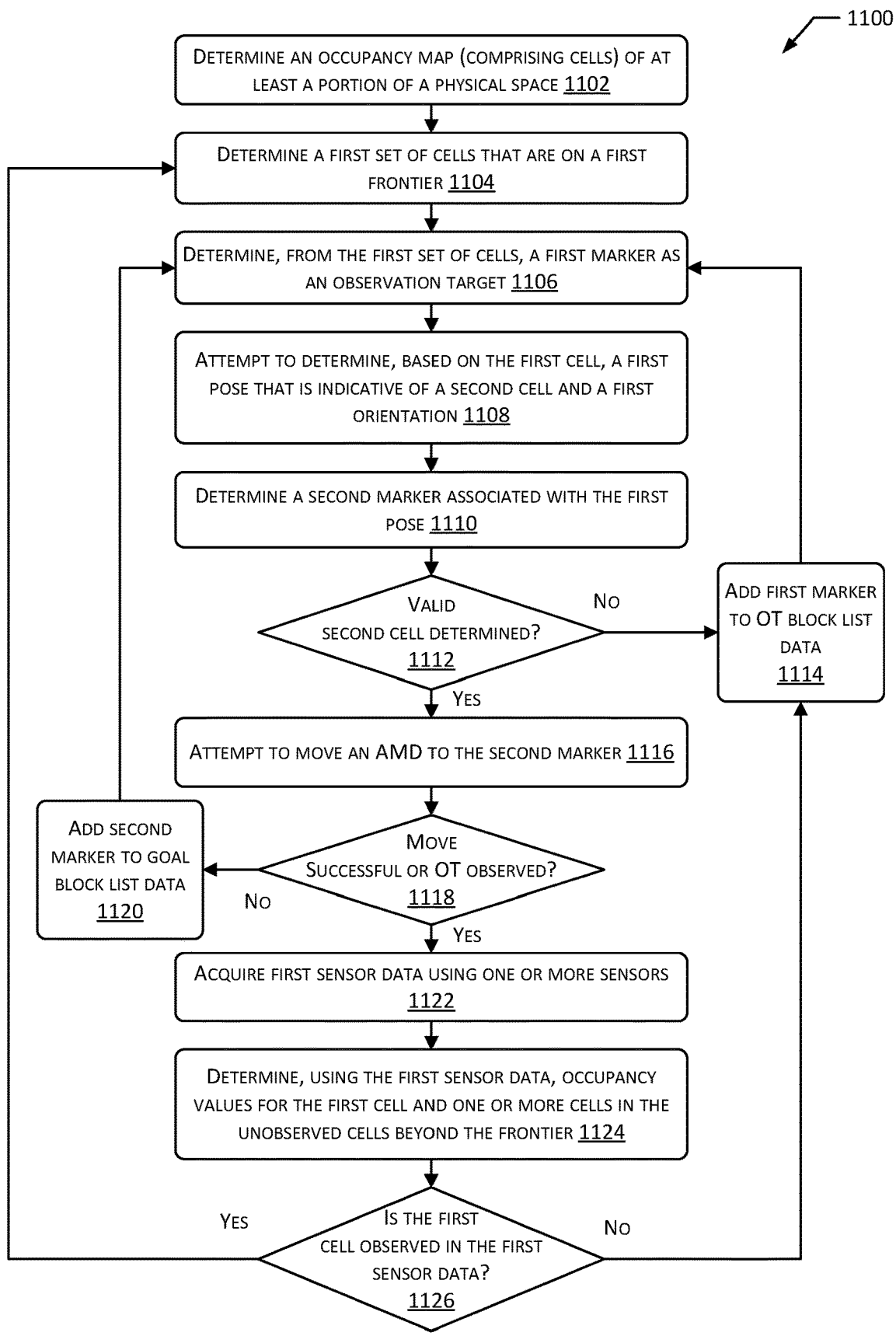
FIG. 11 is a flow diagram of a process for exploring the physical space using markers based on image features, according to some implementations.

FIG. 11 is a flow diagram 1100 of a process for exploring the physical space 102, according to some implementations. The process may be implemented at least in part by one or more of the AMD 104, the docking station 106, or a server.

At 1102 an occupancy map 138 is determined of at least a portion of a physical space 102. For example, the mapping module 118 determines the occupancy map 138 for at least a portion of the physical space 102.

At 1104 the frontier cell data 350 comprising a first set of cells 148 is determined. In one implementation, the frontier module 1002 may determine the frontier cell data 350. The frontier cell data 350 may comprise cells 148 that are associated with a frontier region of the physical space 102 that is located on or near a frontier between an observed portion and an unobserved portion of the physical space 102, such as indicated by the occupancy map 138. For example, the observed portion may comprise the observed cells, such as occupied observed cells 808 and unoccupied observed cells 806, while the unobserved portion comprises the unobserved cells 810. The cells 148 are representative of their associated physical spaces 102. In some situations, a plurality of frontiers may be present. The frontier cell data 350 may comprise information about the cells 148 of one or more frontiers.

At 1106, a first marker associated with an OT cell 814 is determined from the first set of cells 148. For example, the OT module 1006 may determine the OT cell data 352 indicative of the OT cell 814 based on the frontier cell data 350 and the OT parameter data 1008. If a plurality of frontiers are included in the frontier cell data 350, a plurality of OT cells 814 may be determined, one for each respective frontier. A first marker may be determined that is associated with the OT cell 814.

At 1108 an attempt is made to determine, based on the OT cell 814, a goal pose 816 that satisfies the goal pose parameter data 1012 as indicated in goal pose data 354. For example, the goal pose module 1010 may attempt to find a goal pose 816 that meets the constraints specified in the goal pose parameter data 1012.

At 1110 a second marker is determined that is associated with the goal pose 816. For example, the marker location 136 is determined that is closest to and unobstructed with the cell associated with the goal pose 816.

At 1112, if no valid goal pose 816 is determined, the process proceeds to 1114.

At 1114, the first marker associated with the OT cell 814 may be added to the block list data 142. For example, the marker data 134 associated with the OT cell 814 may be added to the OT block list data 910. The process may then return to 1106.

In some implementations, markers may not be added to the block list data 142, or designated as being avoided until some threshold count has been reached, such as a threshold count of failed attempts. In one implementation, a marker associated with an OT cell 814 may not be block listed from consideration until some minimum number of goal poses 816 involving that marker have been attempted and failed. These attempted goal poses 816 may be separated by one or more of some minimum distance or angle. For example, if the OT cell 814 has been unobserved from three separate marker locations 136 for goal poses 816 separated from one another by a minimum distance and angle, the marker associated with the OT cell 814 may be deemed block listed and future attempts to explore would not use this marker as an observation target.

At 1112, if a valid goal pose 816 is determined, the process proceeds to 1116.

At 1116, the AMD 104 attempts to move to the marker location 136 specified by the marker data 134 indicated by the goal pose 816. For example, the marker data 134 may be provided to the autonomous navigation module 144 which then determines path plan data 356 indicative of a path to move the AMD 104 from the current location 802 to the marker location 136 associated with the goal location and goal orientation specified in the goal pose data 354.

At 1118 a determination is made as to whether the move to the marker location 136 associated with the goal pose 816 was successful or the OT cell 814 was observed. For example, the autonomous navigation module 144 may provide movement outcome data 1014 to the exploration module 140. If the move was not successful, the process proceeds to 1120. If the OT cell 814 is observed before the AMD 104 reaches the marker location 136 associated with the goal pose 816, the AMD 104 may cease moving to that marker location 136.

At 1120, the marker associated with the goal pose 816 indicated by the goal pose data 354 is added to the block list data 142. For example, the marker data 134 associated with the goal pose 816 may be added to the goal block list data 916. The process may then return to 1106.

Returning to 1118, if the determination is that the move was successful or the OT cell 814 was observed before reaching the marker location 136 associated with the goal pose 816, the process proceeds to 1122.

At 1122 the AMD 104 uses the one or more sensors 110 to acquire sensor data 114. The sensor FOV 112 extends beyond the frontier, and as a result at least a part of the unobserved portion of the physical space 102 is observed. For example, the AMD 104 may observe the OT cell 814 before reaching the goal pose 816 indicated by the marker location 136. In another example, the AMD 104 may observe the OT cell 814 while at the goal pose 816 indicated by the marker location 136.

At 1124 the sensor data 114 is used to determine occupancy values 408 or other information for cells 148 representing the physical space in the sensor FOV 112. For example, the mapping module 118 may generate occupancy values 908 for the cells 148 indicative of the physical space 102 in the sensor FOV 112 that includes cells 148 that were previously unobserved cells 810.

At 1126 a determination is made as to whether the OT cell 814 is observed in the sensor data 114. For example, the sensor data 114 may be processed to determine if the area corresponding to the OT cell 814 was observed. If at 1126 the OT cell 814 was not observed, the process returns to 1114. In some implementations the marker associated with the goal pose 816 indicated by the goal pose data 354 may be added to the block list data 142.

If at 1126 the OT cell 814 was observed, the process may return to 1104 and be performed again. During subsequent iterations of the process, markers indicated in the block list data 142 may be omitted from further consideration. For example, a previously block listed marker that was associated with an OT cell 814 may be disregarded from consideration in the future as a marker for an OT cell 814. In another example, previously block listed markers associated with an OT cell 814 and goal pose 816 pair may be disregarded. In some implementations, due to inflation, minimum distances, and so forth, a block listed marker may result in block listing applying to a localized region. For example, while a marker associated with a single cell 148 may be block listed, during operation of the system cells 148 that are immediately adjacent to the cell 148 associated with a block listed marker may be avoided.

If the physical space 102 has been explored and no further frontiers are detected, the process may stop. In some implementations, exploration may cease when the frontiers are less than a minimum size, such as encompassing less than a minimum area, exhibiting less than a minimum length, and so forth.

In other implementations representations other than an occupancy map 138 may be used to describe the physical space 102. A first set of candidate frontier areas may be determined, wherein each of the areas in the first set of candidate frontier areas are unobserved areas of the physical space 102 that have not been observed by the AMD 104, and the unobserved areas are adjacent to areas that have been observed by the AMD 104 to be unoccupied; and greater than a first threshold distance from a second area in the physical space 102. The second area may be an area that is indicated in block list data 142 as being excluded from observation. From the first set of candidate frontier areas, a first observation target (OT) area is determined. A first pose is determined in which the AMD 104 will observe the first OT area, the first pose indicative of a third area in the physical space 102 and orientation of the AMD 104 in that third area. The AMD 104 is oriented in the first pose. A determination may be made that the first OT area is not observable by the AMD 104. Responsive to this determination, the first OT area may be included in the block list data 142 to prevent future attempts to observe the first OT area.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed at least in part by an autonomous mobile device (AMD), the method comprising:
   determining an occupancy map representative of a physical space, wherein the occupancy map comprises a plurality of cells with each cell of the plurality of cells being associated with an area in the physical space;
   determining a first set of cells that are associated with a first frontier region of the physical space that is located between an unoccupied and observed portion of the physical space and an unobserved portion of the physical space;
   determining, from the first set of cells, a first cell associated with a first area of the first frontier region;
   determining a first marker associated with the first cell, wherein the first marker is indicative of a first location in the physical space with respect to one or more features depicted in a first image;
   determining, based on the first cell, a first pose that is indicative of a second cell and a first orientation, wherein the second cell is associated with a first area of the observed portion of the physical space;
   determining a second marker associated with the first pose, wherein the second marker is indicative of a second location and second orientation in the physical space with respect to one or more features depicted in a second image;
   moving the AMD to the second location;
   determining, while at the second location, first sensor data using one or more sensors; and
   determining first data based at least in part on the first sensor data, wherein the first data indicates one or more of: the first marker or the second marker are not to be subsequently used while exploring the unobserved portion of the physical space.

2. The method of claim 1, the determining the second marker further comprising:
   determining a first anchor that is indicative of a third location in the physical space with respect to one or more features in a third image, wherein:
   the third location was previously visited by the AMD, the third location is closest to the second location; and
   based at least in part on the occupancy map, no obstacle is present between the second location and the third location; and
   wherein the second marker comprises a first rigid transform that describes the second location with respect to the third location.

3. The method of claim 1, the determining the occupancy map comprising:
   determining, based at least in part on image data comprising a plurality of images, a first trajectory of the AMD through the physical space, wherein the first trajectory comprises a first plurality of poses and each pose, of the first plurality of poses, is associated with a descriptor indicative of a feature depicted in a portion of the image data that is associated with the pose;
   determining a first submap that is associated with a first portion of the physical space and is indicative of presence or absence of an obstacle in the first portion of the physical space;
   associating, with the first submap, a first pose of the first plurality of poses, wherein the first pose is associated with a third location; and
   the determining the second marker comprising:
   determining that the second location is closest to the third location; and
   wherein the second marker is described relative to the first pose.

4. The method of claim 1, further comprising:
  determining, at a third location in the physical space, a keyframe using a simultaneous localization and mapping system;
  determining data indicative of a rigid transform that describes the third location with respect to the second location; and
  wherein the second marker comprises the data indicative of the rigid transform.

5. The method of claim 1, wherein the second marker is indicative of one or more of:
  a map identifier indicative of a map of the physical space,
  a position relative to a first anchor that is indicative of a third location in the physical space with respect to one or more features in a third image,
  illumination data indicative of lighting conditions associated with the one or more features depicted in the second image,
  orientation data indicative of orientation with respect to the one or more features depicted in the first image, or
  one or more coordinates with respect to the occupancy map.

6. The method of claim 1, further comprising:
  determining that the unobserved portion of the physical space is less than a threshold value;
  determining input that is associated with a third location and a third orientation in the physical space;
  determining a third marker that is indicative of the third location and the third orientation in the physical space with respect to one or more features depicted in a third image; and
  storing, in persistent storage, the first data and the third marker.

7. The method of claim 1, further comprising:
  acquiring the second image with a first illumination;
  acquiring a third image with a second illumination; and
  wherein the second marker is indicative of the second location in the physical space with respect to one or more features depicted in the third image.

8. The method of claim 1, the determining the first data comprising:
  moving the AMD to the second location;
  determining, while at the second location, first sensor data using one or more sensors;
  determining, based at least in part on the first sensor data, that the first area of the first frontier region is unobserved; and
  storing the second marker in the first data.

9. The method of claim 1, the determining the first data comprising:
  moving the AMD along at least a portion of a path to the second location;
  determining the AMD is unable to place itself at the second location; and
  storing one or more of the second marker or data indicative of the second location in the first data.

10. An autonomous mobile device (AMD) comprising:
  one or more sensors to acquire sensor data;
  one or more memories storing first computer-executable instructions; and
  one or more processors to execute the first computer-executable instructions to:
    determine, based at least in part on the sensor data, a first set of datum locations, wherein each datum location is associated with a prior location of the AMD in a physical space and a descriptor indicative of a feature in a first portion of the sensor data that is associated with the datum location;
    determine a first marker indicative of a first location in the physical space relative to a subset of the first set of datum locations;
    determine a first submap of a first area in the physical space;
    determine a first anchor, associated with the first submap, that is indicative of a second location in the physical space with respect to one or more features in the first portion of the sensor data, wherein:
      the second location was previously visited by the AMD,
      the second location is closest to the first location; and
    wherein the first marker comprises data indicative of a first rigid transform that describes the first location with respect to the second location.

11. The AMD of claim 10, further comprising instructions to:
  determine, at a third location in the physical space, a keyframe using a simultaneous localization and mapping system;
  determine the data is indicative of the rigid transform that describes the first location with respect to the second location; and
  wherein the first marker comprises the data indicative of the rigid transform.

12. The AMD of claim 10, further comprising instructions to:
  determine a first occupancy map representative of the physical space at a first time, wherein the first occupancy map comprises a plurality of cells with each cell of the plurality of cells being associated with an area in the physical space;
  determine an association between the subset of the first set of datum locations and corresponding cells of the first occupancy map;
  determine an association between the first location and a first cell of the first occupancy map; and
  wherein the first set of datum locations comprises:
    a first datum location that is closest to the first location; and
    for which, based at least in part on the first occupancy map, no obstacle is present between the first location and the first datum location; and
    wherein a rigid transform describes a relationship between the first location and the first datum location.

13. The AMD of claim 10, further comprising instructions to:
  determine a command to move the AMD to the first marker;
  determine a first occupancy map representative of the physical space at a first time, wherein the first occupancy map comprises a plurality of cells with each cell of the plurality of cells being associated with an area in the physical space;
  determine an association between the subset of the first set of datum locations and corresponding cells of the first occupancy map;
  determine, relative to the corresponding cells of the first occupancy map, a first cell associated with the first area in the physical space; and
  move the AMD to the first area in the physical space.

14. The AMD of claim 13, further comprising instructions to:
- determine, while at the first area in the physical space, first sensor data using one or more sensors;
- determine, based at least in part on the first sensor data, that a third area of a first frontier region is unobserved; and
- prevent an attempt to observe the third area from the first marker.

15. The AMD of claim 10, further comprising instructions to:
- move the AMD along at least a portion of a path to the first location;
- determine the AMD is unable to place itself at the first location; and
- prevent an attempt to move again to the first marker.

16. The AMD of claim 10, further comprising instructions to:
- determine, at a first time, a first set of coordinates with respect to a first occupancy map that are associated with the first marker;
- determine, at a second time after the first time, a second occupancy map representative of the physical space at the second time; and
- determine, at the second time, a second set of coordinates with respect to the second occupancy map that are associated with the first marker, wherein the first set of coordinates are different from the second set of coordinates.

17. The AMD of claim 10, wherein the first marker comprises one or more of:
- a map identifier indicative of the physical space,
- illumination data indicative of lighting conditions associated with one or more features depicted in the sensor data associated with the first marker,
- orientation data indicative of orientation with respect to the one or more features depicted in the sensor data associated with the first marker, or
- one or more coordinates with respect to a first occupancy map.

18. A method comprising:
- determining, based at least in part on sensor data, a first set of datum locations, wherein each datum location is associated with a prior location of a device in a physical space and a descriptor indicative of a feature in a portion of the sensor data that is associated with the datum location;
- determining a first marker indicative of a first location in the physical space relative to a subset of the first set of datum locations;
- determining a command to move the device to the first marker;
- determining a first occupancy map representative of the physical space at a first time, wherein the first occupancy map comprises a plurality of cells with each cell of the plurality of cells being associated with an area in the physical space;
- determining an association between the subset of the first set of datum locations and corresponding cells of the first occupancy map;
- determining, relative to the corresponding cells of the first occupancy map, a first cell associated with a first area in the physical space; and
- moving the device to the first area in the physical space.

19. The method of claim 18 further comprising:
- moving the device along at least a portion of a path to the first location;
- determining the device is unable to place itself at the first location; and
- preventing an attempt to move again to the first marker.

20. The method of claim 18, further comprising:
- determining, based at least in part on the sensor data, that a second area of a first frontier region is unobserved; and
- preventing an attempt to observe the second area from the first marker.

* * * * *